United States Patent
Zhang et al.

(10) Patent No.: US 12,550,008 B2
(45) Date of Patent: Feb. 10, 2026

(54) COMMUNICATION METHOD AND APPARATUS

(71) Applicant: HUAWEI TECHNOLOGIES CO., LTD., Shenzhen (CN)

(72) Inventors: Shubing Zhang, Dongguan (CN); Fan Yang, Shanghai (CN); Huidong Jia, Beijing (CN); Zexu Huang, Dongguan (CN); Ridong Xu, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 468 days.

(21) Appl. No.: 18/155,580

(22) Filed: Jan. 17, 2023

(65) Prior Publication Data
US 2023/0156527 A1    May 18, 2023

Related U.S. Application Data

(63) Continuation of application No. PCT/CN2021/106285, filed on Jul. 14, 2021.

(30) Foreign Application Priority Data

Jul. 17, 2020 (CN) .......................... 202010697927.0
Nov. 20, 2020 (CN) .......................... 202011312252.X

(51) Int. Cl.
*H04W 28/24* (2009.01)
*H04W 28/18* (2009.01)
*H04W 76/38* (2018.01)

(52) U.S. Cl.
CPC .......... *H04W 28/24* (2013.01); *H04W 28/18* (2013.01); *H04W 76/38* (2018.02)

(58) Field of Classification Search
CPC ..... H04W 28/24; H04W 28/18; H04W 76/38; H04W 88/14; H04W 92/24; H04W 24/04;
(Continued)

(56) References Cited

U.S. PATENT DOCUMENTS

| | | | |
|---|---|---|---|
| 2018/0270715 A1* | 9/2018 | Lee | H04L 12/4633 |
| 2019/0150219 A1* | 5/2019 | Wang | H04W 36/0033 370/329 |
| 2020/0092424 A1* | 3/2020 | Qiao | H04L 12/1407 |

FOREIGN PATENT DOCUMENTS

| | | | |
|---|---|---|---|
| CA | 3114150 A1 | 4/2020 | |
| CN | 101304544 B | 5/2011 | |

(Continued)

OTHER PUBLICATIONS

"3rd Generation Partnership Project; Technical Specification Group Services and System Aspects; System architecture for the 5G System (5GS); Stage 2 (Release 16)," 3GPP TS 23.501 V16.5.0, Total 441 pages (Jul. 2020).

(Continued)

*Primary Examiner* — Shawn D Miller
(74) *Attorney, Agent, or Firm* — Leydig, Voit & Mayer, Ltd.

(57) ABSTRACT

A communication method and apparatus are provided that relate to the communications field. The method includes receiving, by a user plane network element from a control plane network element, information indicating a first policy for maintaining, when the user plane is disconnected from the control plane, continuity of a service of the user plane; and running, by the user plane network element, the service according to the first policy. In this way, the user plane network element may, when the user plane is disconnected from the control plane, maintain the continuity of the service of the user plane network element, to avoid service disconnection and meet an application scenario having a high requirement on service continuity.

18 Claims, 13 Drawing Sheets

(58) Field of Classification Search
CPC ..... H04W 16/10; H04W 28/06; H04W 48/02; H04W 76/10; H04W 76/30; H04L 69/40; H04L 65/1016; H04L 41/142; H04L 41/0894; H04L 65/1083; H04L 67/145
See application file for complete search history.

(56) References Cited

FOREIGN PATENT DOCUMENTS

| | | |
|---|---|---|
| CN | 110536330 A | 12/2019 |
| CN | 111083718 A | 4/2020 |
| JP | 2020512734 A | 4/2020 |
| WO | 2017026263 A1 | 2/2017 |
| WO | 2018058618 A1 | 4/2018 |
| WO | 2019219619 A1 | 11/2019 |

OTHER PUBLICATIONS

Ericsson, "23.501: UPF and SMF Service Areas," SA WG2 Meeting #120, Busan, Korea, S2-171750, Total 8 pages (Mar. 27-31, 2017).

"3rd Generation Partnership Project; Technical Specification Group Core Network and Terminals; 5G System; Restoration Procedures (Release 16)," 3GPP TS 23.527 V16.3.0, Total 23 pages (Jun. 2020).

"3rd Generation Partnership Project; Technical Specification Group Radio Access Network; NR; NR and NG-RAN Overall Description; Stage 2 (Release 16)," 3GPP Ts 38.300 V16.1.0, Total 133 pages (Mar. 2020).

* cited by examiner

COMMUNICATION METHOD AND APPARATUS

CROSS-REFERENCE TO RELATED APPLICATIONS

This application is a continuation of International Application No. PCT/CN2021/106285, filed on Jul. 14, 2021, which claims priority to Chinese Patent Application No. 202010697927.0, filed on Jul. 17, 2020 and Chinese Patent Application No. 202011312252.X, filed on Nov. 20, 2020. All of the aforementioned patent applications are hereby incorporated by reference in their entireties.

TECHNICAL FIELD

The disclosure relates to the field of communication technologies, and in particular, to a communication method and apparatus.

BACKGROUND

In a 5th generation mobile network (5G) system architecture, a session management function (SMF) network element in a 5G core network control plane (NG-CP) and a user plane network function (UPF) network element in a 5G core network user plane (NG-UP) may exchange a message through an N4 interface.

In a 5G core network system, a detection mechanism may be designed for the N4 interface to detect whether communication between the UPF network element and the SMF network element is normal. When the communication between the UPF network element and the SMF network element is abnormal (for example, a fault or communication disconnection), the UPF network element forcibly releases a session.

However, forcibly releasing the session by the UPF network element causes session interruption, resulting in service discontinuity.

SUMMARY

Embodiments of this application provide a communication method and apparatus, to indicate a user plane network element in advance to maintain, when the user plane is disconnected from a control plane, continuity of a service of the user plane network element, to avoid service disconnection and meet an application scenario having a high requirement on service continuity.

According to a first aspect, an embodiment of this application provides a communication method, including: A user plane network element receives, from a control plane network element, information indicating a first policy, where the first policy indicates to maintain, when the user plane is disconnected from the control plane, continuity of a service of the user plane; and the user plane network element runs the service according to the first policy. In this way, the user plane network element may be indicated in advance to maintain, when the user plane is disconnected from the control plane, the continuity of the service of the user plane network element. This can avoid service disconnection and meet an application scenario having a high requirement on service continuity.

That the user plane is disconnected from the control plane in this embodiment of this application may include: The user plane network element is disconnected from the control plane network element, a radio access network device is disconnected from the control plane network element, or both the user plane network element and the radio access network device are disconnected from the control plane network element.

In a possible implementation, the first policy includes one or more of the following: a policy indicating to continue to run, when the user plane is disconnected from the control plane, the service of the user plane; a policy indicating to continue to run, when the user plane is disconnected from the control plane, the service of the user plane until the service of the user plane ends; a policy indicating to continue to run, when the user plane is disconnected from the control plane, the service of the user plane until a connection between the control plane and the user plane is recovered; a policy indicating to configure, when the user plane is disconnected from the control plane and a traffic quota of the user plane in a current period is used up, first duration and/or a first threshold of traffic for the service of the user plane, so that the service of the user plane continues to be run based on the first duration and/or the first threshold of traffic; or a policy indicating to continue to run, when the user plane is disconnected from the control plane and use time of a traffic quota of the user plane in a current period expires, the service of the user plane until the traffic quota of the user plane in the current period is used up. In this way, the user plane network element can run the service according to the first policy, to maintain the continuity of the service of the user plane network element.

In a possible implementation, the information indicating the first policy is an enumerated value. In this way, for indicating the first policy, only the enumerated value may be transferred, and the first policy itself does not need to be transferred, to save communication resources.

In a possible implementation, the first policy is determined by the control plane network element based on traffic quota information of the service and policy control information of the service.

In a possible implementation, that the user plane network element runs the service according to the first policy includes: The user plane network element maintains a data channel connection relationship with a first radio access network device when the user plane is disconnected from the control plane, where the first radio access network device is a radio access network device connected to the user plane network element when the user plane is disconnected from the control plane.

In a possible implementation, the first policy includes a policy indicating to disable, when the user plane is disconnected from the control plane, a session control timer mechanism.

In a possible implementation, that a user plane network element receives, from a control plane network element, information indicating a first policy includes: The user plane network element receives a message from the control plane network element, where the message does not carry a header field related to a session control timer mechanism; and the user plane network element sends the message to a terminal device. In this way, the terminal device can maintain the continuity of the service of the user plane when the user plane is disconnected from the control plane.

In a possible implementation, the method further includes: The user plane network element determines traffic usage of the service run during disconnection between the user plane and the control plane; and the user plane network element sends the traffic usage to the control plane network element when the connection between the control plane and the user plane is recovered.

According to a second aspect, an embodiment of this application provides a communication method, including: A control plane network element determines a first policy, where the first policy indicates to maintain, when a user plane is disconnected from the control plane, continuity of a service of the user plane; and the control plane network element sends, to the user plane network element and/or a radio access network device, information indicating the first policy.

In a possible implementation, the first policy includes one or more of the following: a policy indicating to continue to run, when the user plane is disconnected from the control plane, the service of the user plane; a policy indicating to continue to run, when the user plane is disconnected from the control plane, the service of the user plane until the service of the user plane ends; a policy indicating to continue to run, when the user plane is disconnected from the control plane, the service of the user plane until a connection between the control plane and the user plane is recovered; a policy indicating to configure, when the user plane is disconnected from the control plane and a traffic quota of the user plane in a current period is used up, first duration and/or a first threshold of traffic for the service of the user plane, so that the service of the user plane continues to be run based on the first duration and/or the first threshold of traffic; or a policy indicating to continue to run, when the user plane is disconnected from the control plane and use time of a traffic quota of the user plane in a current period expires, the service of the user plane until the traffic quota of the user plane in the current period is used up. In this way, the user plane network element can run the service according to the first policy, to maintain the continuity of the service of the user plane network element.

In a possible implementation, that a control plane network element determines a first policy includes: The control plane network element receives a session creation request; and the control plane network element determines the first policy based on traffic quota information of the service and policy control information of the service.

In a possible implementation, the information indicating the first policy is an enumerated value. In this way, for indicating the first policy, only the enumerated value may be transferred, and the first policy itself does not need to be transferred, to save communication resources.

In a possible implementation, the method further includes: The control plane network element indicates the radio access network device to enable an inactive mode mechanism for a terminal device.

In a possible implementation, the first policy includes a policy indicating to disable, when the user plane is disconnected from the control plane, a session control timer mechanism.

According to a third aspect, an embodiment of this application provides a communication method, including: A second radio access network device determines that a user plane is disconnected from a control plane; and the second radio access network device maintains continuity of a service of the user plane when the user plane is disconnected from the control plane.

In a possible implementation, that the second radio access network device maintains continuity of a service of the user plane when the user plane is disconnected from the control plane includes: The second radio access network device obtains context data of a terminal device from a first radio access network device, where the first radio access network device is a radio access network device that communicates with the terminal device when the user plane is disconnected from the control plane, and the context data of the terminal device is used to recover a connection between the terminal device and the second radio access network device; the second radio access network device notifies the first radio access network device to maintain a connection to the user plane network element; and the second radio access network device forwards data of the terminal device to the user plane network element via the first radio access network device.

In a possible implementation, that a second radio access network device determines that a user plane is disconnected from a control plane includes: The second radio access network device receives first indication information from a first network element, where the first network element is deployed in a physical location area to which the user plane network element belongs, and the first indication information indicates that the user plane is disconnected from the control plane.

In a possible implementation, the first indication information is a cause value.

According to a fourth aspect, an embodiment of this application provides a communication method, including: A first network element establishes a communication connection to a radio access network device when a user plane is disconnected from a control plane, where the first network element is deployed in a physical location area to which the user plane network element belongs; and the first network element maintains continuity of a service of the user plane based on the communication connection to the radio access network device. In this embodiment of this application, the radio access network device may be a first radio access network device or a second radio access network device. This is not specifically limited in this embodiment of this application.

In a possible implementation, that the first network element maintains continuity of a service of the user plane based on the communication connection to the radio access network device includes: The first network element sends first indication information to the radio access network device, where the first indication information indicates that the user plane is disconnected from the control plane.

In a possible implementation, the method further includes: The first network element indicates, via a second network element, the user plane network element to establish a data channel connection relationship with the radio access network device, where the second network element is deployed in the physical location area to which the user plane network element belongs, and a communication interface exists between the second network element and each of the first network element and the user plane network element.

According to a fifth aspect, an embodiment of this application provides a communication method, including: A radio access network device receives, from a control plane network element, information indicating a first policy, where the first policy indicates to maintain, when a user plane is disconnected from the control plane, continuity of a service of the user plane; and the radio access network device runs the service according to the first policy.

That a user plane is disconnected from the control plane in this embodiment of this application may include: The user plane network element is disconnected from the control plane network element, a radio access network device is disconnected from the control plane network element, or both the user plane network element and the radio access network device are disconnected from the control plane network element.

In a possible implementation, the first policy includes one or more of the following: a policy indicating to continue to run, when the user plane is disconnected from the control plane, the service of the user plane; a policy indicating to continue to run, when the user plane is disconnected from the control plane, the service of the user plane until the service of the user plane ends; or a policy indicating to continue to run, when the user plane is disconnected from the control plane, the service of the user plane until a connection between the control plane and the user plane is recovered.

In a possible implementation, the information indicating the first policy is an enumerated value.

According to a sixth aspect, an embodiment of this application provides a communication apparatus. The communication apparatus may be a user plane network element, a radio access network device, a chip or a chip system in the user plane network element, or a chip or a chip system in the radio access network device. The communication apparatus may include a processing unit and a communication unit. When the communication apparatus is the user plane network element or the radio access network device, the processing unit may be a processor, and the communication unit may be a communication interface or an interface circuit. The communication apparatus may further include a storage unit, and the storage unit may be a memory. The storage unit is configured to store instructions, and the processing unit executes the instructions stored in the storage unit, so that the radio access network apparatus implements the communication method in any one of the first aspect or the possible implementations of the first aspect. When the communication apparatus is the chip or the chip system in the user plane network element or the chip or the chip system in the radio access network device, the processing unit may be a processor, and the communication unit may be a communication interface. For example, the communication interface may be an input/output interface, a pin, or a circuit. The processing unit executes the instructions stored in the storage unit, so that the user plane network element or the radio access network device implements the communication method in any one of the possible implementations of the first aspect or the fifth aspect. The storage unit may be a storage unit (for example, a register or a cache) in the chip, or may be a storage unit (for example, a read-only memory or a random access memory) that is in the radio access network apparatus and that is outside the chip.

For example, the communication unit is configured to receive, from a control plane network element, information indicating a first policy, where the first policy indicates to maintain, when the user plane is disconnected from the control plane, continuity of a service of the user plane; and the processing unit is configured to run the service according to the first policy.

In a possible implementation, the communication unit is specifically configured to receive, from the control plane network element, information about a policy indicating to continue to run, when the user plane is disconnected from the control plane, the service of the user plane.

In a possible implementation, the communication unit is specifically configured to receive, from the control plane network element, information about a policy indicating to continue to run, when the user plane is disconnected from the control plane, the service of the user plane until the service of the user plane ends.

In a possible implementation, the communication unit is specifically configured to receive, from the control plane network element, information about a policy indicating to continue to run, when the user plane is disconnected from the control plane, the service of the user plane until a connection between the control plane and the user plane is recovered.

In a possible implementation, the communication unit is specifically configured to receive, from the control plane network element, information about a policy indicating to configure, when the user plane is disconnected from the control plane and a traffic quota of the user plane in a current period is used up, first duration and/or a first threshold of traffic for the service of the user plane, so that the service of the user plane continues to be run based on the first duration and/or the first threshold of traffic.

In a possible implementation, the communication unit is specifically configured to receive, from the control plane network element, information about a policy indicating to continue to run, when the user plane is disconnected from the control plane and use time of a traffic quota of the user plane in a current period expires, the service of the user plane until the traffic quota of the user plane in the current period is used up.

In a possible implementation, the communication unit is specifically configured to receive an enumerated value from the control plane network element.

In a possible implementation, the first policy is determined by the control plane network element based on traffic quota information of the service and policy control information of the service.

In a possible implementation, the processing unit is specifically configured to: maintain a data channel connection relationship with a first radio access network device when the user plane is disconnected from the control plane, where the first radio access network device is a radio access network device connected to the user plane network element when the user plane is disconnected from the control plane.

In a possible implementation, the processing unit is specifically configured to run the service based on a policy indicating to disable, when the user plane is disconnected from the control plane, a session control timer mechanism.

In a possible implementation, the communication unit is specifically configured to receive a message from the control plane network element, where the message does not carry a header field related to a session control timer mechanism; and the communication unit is further specifically configured to send the message to a terminal device.

In a possible implementation, the processing unit is specifically configured to determine traffic usage of the service run during disconnection between the user plane and the control plane; and the communication unit is specifically configured to send the traffic usage to the control plane network element when the connection between the control plane and the user plane is recovered.

In a possible implementation, the processing unit is specifically configured to: when the service is not run for more than second duration, trigger checking of resource usage; when a resource usage rate exceeds a threshold, trigger checking of resource usage; or when the connection between the control plane and the user plane is recovered, trigger checking of resource usage.

According to a seventh aspect, an embodiment of this application provides a communication apparatus. The communication apparatus may be a control plane network element, or may be a chip or a chip system in the control plane network element. The communication apparatus may include a processing unit and a communication unit. When the communication apparatus is the control plane network element, the processing unit may be a processor, and the communication unit may be a communication interface or an interface circuit. The communication apparatus may further include a storage unit, and the storage unit may be a memory. The storage unit is configured to store instructions, and the processing unit executes the instructions stored in the storage unit, so that the radio access network apparatus implements the communication method in any one of the second aspect or the possible implementations of the second aspect. When the communication apparatus is the chip or the chip system in the control plane network element, the processing unit may be a processor, and the communication unit may be a communication interface. For example, the communication interface may be an input/output interface, a pin, or a circuit. The processing unit executes the instructions stored in the storage unit, so that the radio access network apparatus implements the communication method in any one of the second aspect or the possible implementations of the second aspect. The storage unit may be a storage unit (for example, a register or a cache) in the chip, or may be a storage unit (for example, a read-only memory or a random access memory) that is in the radio access network apparatus and that is outside the chip.

For example, the processing unit is configured to determine a first policy, where the first policy indicates to maintain, when a user plane is disconnected from the control plane, continuity of a service of the user plane; and the communication unit is configured to send, to the user plane network element, information indicating the first policy.

In a possible implementation, the communication unit is specifically configured to send, to the user plane network element, information about a policy indicating to continue to run, when the user plane is disconnected from the control plane, the service of the user plane.

In a possible implementation, the communication unit is specifically configured to send, to the user plane network element, information about a policy indicating to continue to run, when the user plane is disconnected from the control plane, the service of the user plane until the service of the user plane ends.

In a possible implementation, the communication unit is specifically configured to send, to the user plane network element, information about a policy indicating to continue to run, when the user plane is disconnected from the control plane, the service of the user plane until a connection between the control plane and the user plane is recovered.

In a possible implementation, the communication unit is specifically configured to send, to the user plane network element, information about a policy indicating to configure, when the user plane is disconnected from the control plane and a traffic quota of the user plane in a current period is used up, first duration and/or a first threshold of traffic for the service of the user plane, so that the service of the user plane continues to be run based on the first duration and/or the first threshold of traffic.

In a possible implementation, the communication unit is specifically configured to send, to the user plane network element, information about a policy indicating to continue to run, when the user plane is disconnected from the control plane and use time of a traffic quota of the user plane in a current period expires, the service of the user plane until the traffic quota of the user plane in the current period is used up.

In a possible implementation, the communication unit is specifically configured to receive a session creation request; and the processing unit is specifically configured to determine the first policy based on traffic quota information of the service and policy control information of the service.

In a possible implementation, the processing unit indicates the radio access network device to enable an inactive mode mechanism for a terminal device.

In a possible implementation, the processing unit is specifically configured to determine a policy of disabling, when the user plane is disconnected from the control plane, a session control timer mechanism.

According to an eighth aspect, an embodiment of this application provides a communication apparatus. The communication apparatus may be a second radio access network device, or a chip or a chip system in the second radio access network device. The communication apparatus may include a processing unit and a communication unit. When the communication apparatus is the second radio access network device, the processing unit may be a processor, and the communication unit may be a communication interface or an interface circuit. The communication apparatus may further include a storage unit, and the storage unit may be a memory. The storage unit is configured to store instructions, and the processing unit executes the instructions stored in the storage unit, so that the radio access network apparatus implements the communication method in any one of the second aspect or the possible implementations of the second aspect. When the communication apparatus is the chip or the chip system in the second radio access network device, the processing unit may be a processor, and the communication unit may be a communication interface. For example, the communication interface may be an input/output interface, a pin, or a circuit. The processing unit executes the instructions stored in the storage unit, so that the radio access network apparatus implements the communication method in any one of the third aspect or the possible implementations of the third aspect. The storage unit may be a storage unit (for example, a register or a cache) in the chip, or may be a storage unit (for example, a read-only memory or a random access memory) that is in the radio access network apparatus and that is outside the chip.

For example, the processing unit is configured to maintain continuity of a service of a user plane when the user plane is disconnected from a control plane; and the communication unit is configured to determine that the user plane is disconnected from the control plane.

In a possible implementation, the processing unit is specifically configured to obtain context data of a terminal device from a first radio access network device, where the first radio access network device is a radio access network device that communicates with the terminal device when the user plane is disconnected from the control plane, and the context data of the terminal device is used to recover a connection between the terminal device and the second radio access network device; the processing unit is specifically configured to notify the first radio access network device to maintain a connection to the user plane network element; and the communication unit is configured to forward data of the terminal device to the user plane network element via the first radio access network device.

The communication unit is specifically configured to receive first indication information from a first network element, where the first network element is deployed in a physical location area to which the user plane network element belongs, and the first indication information indicates that the user plane is disconnected from the control plane.

In a possible implementation, the first indication information is a cause value.

According to a ninth aspect, an embodiment of this application provides a communication apparatus. The communication apparatus may be a first network element, or may be a chip or a chip system in the first network element device. The communication apparatus may include a processing unit and a communication unit. When the communication apparatus is the first network element, the processing unit may be a processor, and the communication unit may be a communication interface or an interface circuit. The communication apparatus may further include a storage unit, and the storage unit may be a memory. The storage unit is configured to store instructions, and the processing unit executes the instructions stored in the storage unit, so that the radio access network apparatus implements the communication method in any one of the fourth aspect or the possible implementations of the fourth aspect. When the communication apparatus is the chip or the chip system in the first network element, the processing unit may be a processor, and the communication unit may be a communication interface. For example, the communication interface may be an input/output interface, a pin, or a circuit. The processing unit executes the instructions stored in the storage unit, so that the radio access network apparatus implements the communication method in any one of the second aspect or the possible implementations of the second aspect. The storage unit may be a storage unit (for example, a register or a cache) in the chip, or may be a storage unit (for example, a read-only memory or a random access memory) that is in the radio access network apparatus and that is outside the chip.

For example, the processing unit is configured to establish a communication connection to a second radio access network device, where the first network element is deployed in a physical location area to which the user plane network element belongs; and the communication unit is configured to maintain continuity of a service of the user plane based on the communication connection to the second radio access network device.

In a possible implementation, the communication unit is specifically configured to send first indication information to the second radio access network device, where the first indication information indicates that the user plane is disconnected from the control plane.

In a possible implementation, the processing unit is specifically configured to indicate the user plane network element to establish a data channel connection relationship with the second radio access network device, where a second network element is deployed in the physical location area to which the user plane network element belongs, and a communication interface exists between the second network element and each of the first network element and the user plane network element.

According to a tenth aspect, an embodiment of this application provides a computer-readable storage medium. The computer-readable storage medium stores a computer program or instructions. When the computer program or the instructions are run on a computer, the computer is enabled to perform the communication method in any one of the implementations of the first aspect to the fourth aspect.

According to an eleventh aspect, an embodiment of this application provides a computer program product including instructions. When the instructions are run on a computer, the computer is enabled to perform the communication method in any one of the implementations of the first aspect to the fourth aspect.

According to a twelfth aspect, an embodiment of this application provides a communication system. The communication system includes any one or more of the following: the communication apparatus described in the fifth aspect and the possible implementations of the fifth aspect, the communication apparatus described in the sixth aspect and the possible implementations of the sixth aspect, the communication apparatus described in the seventh aspect and the possible implementations of the seventh aspect, and the communication apparatus described in the eighth aspect and the possible implementations of the eighth aspect.

According to a thirteenth aspect, an embodiment of this application provides a communication apparatus. The communication apparatus includes a processor and a storage medium. The storage medium stores instructions. When the instructions are run by the processor, the communication method described in any one of the implementations of the first aspect to the fourth aspect is implemented.

According to a fourteenth aspect, this application provides a chip or a chip system. The chip or the chip system includes at least one processor and a communication interface. The communication interface and the at least one processor are interconnected through a line. The at least one processor is configured to run a computer program or instructions, to perform the communication method described in any one of the implementations of the first aspect to the fourth aspect.

It should be understood that the second aspect to the fourteenth aspect in embodiments of this application correspond to the technical solutions of the first aspect in embodiments of this application, and beneficial effects achieved in the aspects and feasible implementations corresponding to the aspects are similar. Details are not described again.

DESCRIPTION OF EMBODIMENTS

Figure 1:
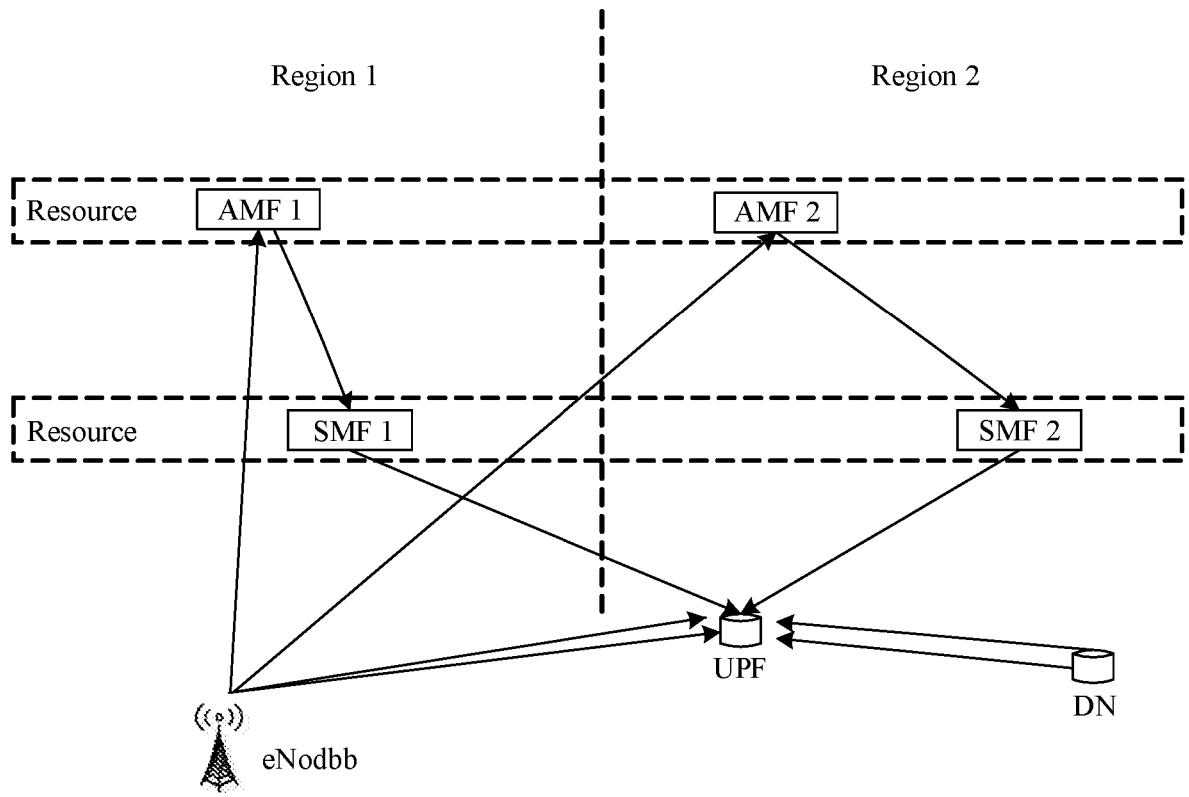
FIG. 1 is a schematic diagram of an architecture of a region data center telco cloud.

To clearly describe technical solutions in embodiments of this application, terms such as "first" and "second" are used in embodiments of this application to distinguish between same items or similar items that provide basically same functions or purposes. For example, a first radio access network device and a second radio access network device are merely intended to distinguish between different radio access network devices, and do not limit a sequence of the first radio access network device and the second radio access network device. A person skilled in the art may understand that the terms such as "first" and "second" do not limit a quantity or an execution sequence, and the terms such as "first" and "second" do not indicate a definite difference.

It should be noted that, in this application, terms such as "example" or "for example" are used to represent giving an example, an illustration, or a description. Any embodiment or design scheme described as an "example" or "for example" in this application should not be explained as being more preferable or having more advantages than another embodiment or design scheme. Exactly, use of the terms such as "example" or "for example" is intended to present a related concept in a specific manner.

In this application, "at least one" refers to one or more, and "a plurality of" refers to two or more. "And/or" describes an association relationship between associated objects, and represents that three relationships may exist. For example, A and/or B may represent the following cases: Only A exists, both A and B exist, and only B exists, where A and B may be singular or plural. The character "/" generally indicates an "or" relationship between the associated objects. "At least one item (piece) of the following" or a similar expression thereof indicates any combination of the items, including any combination of singular items (pieces) or plural items (pieces). For example, at least one of a, b, or c may indicate: a, b, c, a and b, a and c, b and c, or a, b, and c, where a, b, and c may be singular or plural.

In a 5th generation (5G) mobile network system architecture, an SMF network element and a UPF network element may exchange a message through an N4 interface. For example, user policy delivery from a control plane (CP) to a user plane (UP) and event reporting processing from the user plane to the control plane are supported through the N4 interface. For example, the SMF network element is responsible for management functions such as UPF network element selection, policy delivery, and event reporting, and the UPF network element is responsible for processing a user packet, such as forwarding and charging.

In a 5G network architecture, a network architecture of a 5G core network (5GC) may use a plurality of manners. In a possible implementation, a carrier may deploy the 5G core network in a centralized manner by using a region data center or on infrastructure of a region (region) and an availability zone (AZ) of a public cloud. In a possible implementation, the 5G core network may be applied to a service of a vertical industry. Diversified services of the vertical industry have a high requirement on reliability, and usually require service continuity. For example, the service of the vertical industry may include one or more of the following: an ultra-reliable low-latency communication (URLLC) service (for example, a smart manufacturing factory or Internet of Vehicles), an enhanced mobile broadband (eMBB) service (for example, a cloud game, a media live broadcast, a remote surgery, a remote conference, or distance education), or the like.

For example, FIG. 1 is a schematic diagram of a telco cloud construction architecture of a region data center. As shown in FIG. 1, the telco cloud construction architecture of the region data center may include a plurality of regions, each region includes a corresponding control plane network element, and a user plane network element has a communication relationship with a base station and a data network (DN). There are many networking topology layers and fault mode combinations are complex. When a natural disaster (such as a fire or an earthquake) or an external factor (such as a power failure of the region data center) occurs, disaster recovery switchover may fail or a network may be interrupted. For example, although a disaster recovery capability is provided between disaster recovery regions, an SMF network element of a disaster recovery data center may be faulty due to a software defined networking (SDN) exception or a centralized downlink impact accumulated by a third-party application during a fault, and consequently, a takeover fails. In addition, an N4 interface between the SMF network element and the UPF network element and an N2 interface between a radio access network device and an AMF network element correspond to a long-distance bearer network. Heavy traffic caused in a disaster recovery switchover scenario may cause interface congestion, packet loss, or intermittent disconnection, and consequently, the user plane is disconnected from the control plane.

Figure 2:
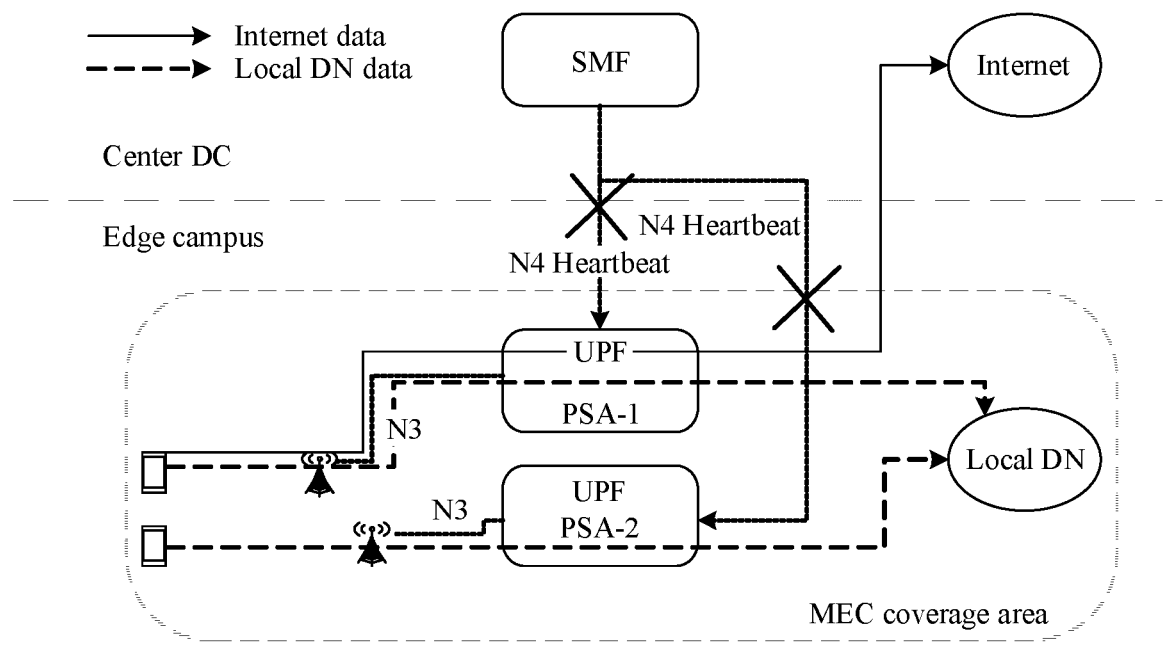
FIG. 2 is a schematic diagram of an architecture in which 5G is applied to a manufacturing factory in an enterprise campus.

For example, FIG. 2 is a schematic diagram of an architecture in which 5G is applied to a manufacturing factory in an enterprise campus. As shown in FIG. 2, an enterprise campus is connected to a 5GC control plane of a carrier data center (DC). The enterprise campus and the data center may communicate over a long distance. A long link and many nodes are involved. For example, a link may be "a campus slicing packet network (SPN)→a surrounding rent base station→a plurality of intermediate equipment rooms/fiber patch cords→a hub building→provincial backbone wavelength division→a 5GC core network". Any link or node fault may cause disconnection between a user plane and the control plane. For example, there are many uncontrollable factors such as municipal road construction. Although a bearer network may have redundancy design, a network may still be interrupted. For example, some regions are not far away from each other. For example, a city A and a city B are more than 300 kilometers away from each other. However, primary and secondary regions are faulty at the same time due to force majeure such as an earthquake, and consequently, the user plane is disconnected from the control plane. However, if a data center control plane is faulty or disconnected, campus production may stop. Therefore, the scenario corresponding to FIG. 2 has a high requirement on reliability.

Figure 3:
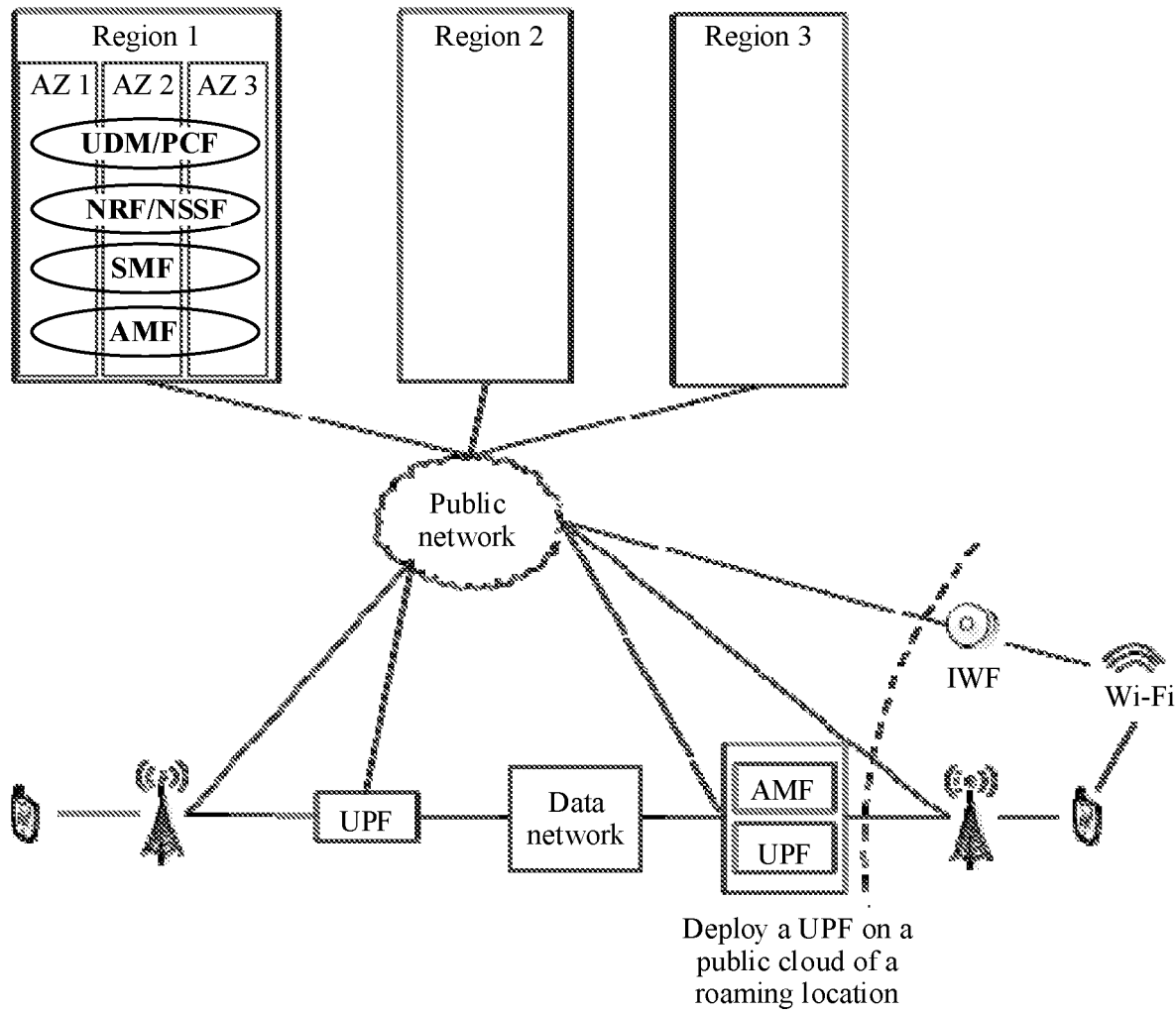
FIG. 3 is a schematic diagram of a 5GC cloud service architecture.

For example, FIG. 3 is a schematic diagram of a 5GC cloud service architecture. As shown in FIG. 3, a control plane is deployed in a region/an AZ of a public cloud center, UPF network elements may be deployed at edges of cities in a distributed manner, and a city and a data center communicate with each other through a public network. Public network communication is widely used, and a large quantity of users use the public network. Therefore, transmission quality is not guaranteed, and a network may be interrupted, and consequently, a user plane is disconnected from the control plane. That a user plane is disconnected from the control plane in this embodiment of this application may include: A user plane network element is disconnected from a control plane network element, a radio access network device is disconnected from the control plane network element, or both the user plane network element and the radio access network device are disconnected from the control plane network element.

In a possible implementation, a device-level fault perception mechanism and a session-level check mechanism are designed for an N4 interface between a UPF network element and an SMF network element in a 5GC system. The device-level fault perception mechanism may be: whether a fault exists between devices is detected using a device as a detection granularity. For example, in the device-level fault perception mechanism, whether communication between the SMF network element and the UPF network element is normal may be perceived based on a quantity of heartbeats. The session-level check mechanism may be: whether a fault exists in a session is detected using a session as a detection granularity. For example, in the session-level check mechanism, whether session data between the SMF network element and the UPF network element is consistent may be perceived based on a quantity of heartbeats. Generally, if a user plane UPF network element discovers that a control plane SMF network element is faulty or communication is disconnected, the user plane UPF network element forcibly releases a session within a period of time. Alternatively, after a fault on the control plane is recovered, the UPF network element forcibly releases a session to maintain session data consistency with the SMF network element. Consequently, a service is interrupted, and a requirement of an industry such as a manufacturing factory on service continuity cannot be met.

In addition, an SCTP link is established at an N2 interface between a 5G access network device and a control plane AMF network element in a 5G core network. If links between the 5G access network device and all AMF network elements are interrupted, a radio access network device forcibly releases a session, and consequently, service continuity cannot be ensured.

Based on this, embodiments of this application provide a communication method. When a user plane is disconnected from a control plane, the user plane network element may receive, from the control plane network element, information indicating a first policy, to maintain continuity of a service of the user plane, and avoid service discontinuity caused by a fault on the control plane/communication disconnection. A specific implementation is described in detail in a subsequent embodiment. Details are not described herein again.

The communication method provided in embodiments of this application may be applied to a long term evolution (LTE) system, a 5G system, or a future mobile communication system. This is not specifically limited in embodiments of this application. For ease of description, an example in which embodiments of this application are applied to a 5G system is subsequently used for description. The example does not constitute a limitation on a communication system to which embodiments of this application are applied.

Figure 4:
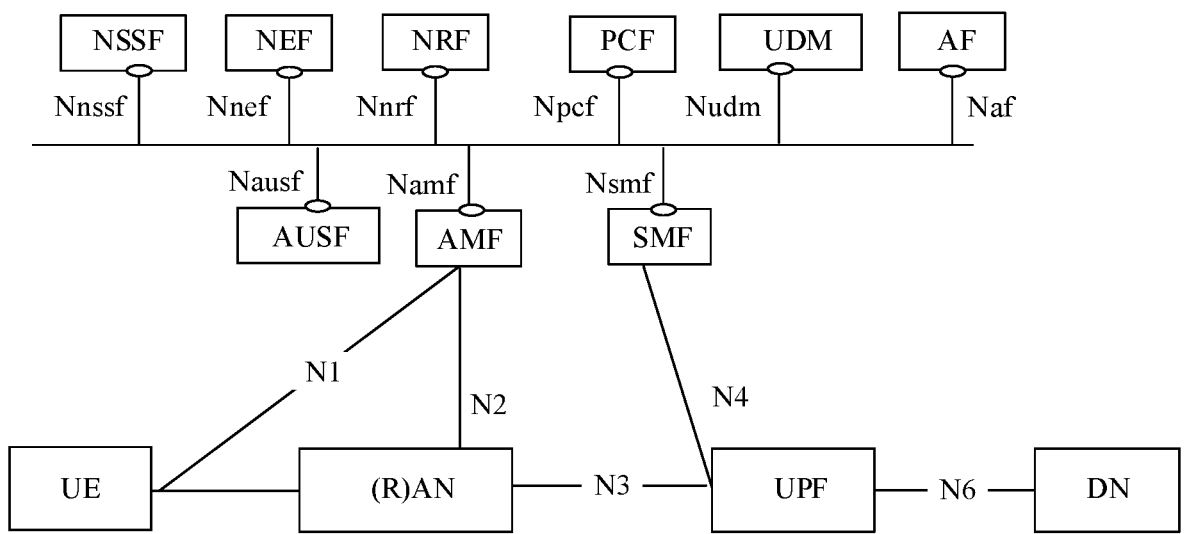
FIG. 4 is a schematic diagram of a network architecture according to an embodiment of this application.

For example, FIG. 4 is a schematic diagram of a network architecture according to an embodiment of this application. The network architecture includes a terminal device, an access network (AN), a core network, and a data network (DN). The terminal device may be a network terminal device such as a mobile phone or an Internet of Things terminal device. An access network apparatus is mainly configured to implement functions such as a radio physical layer function, resource scheduling, radio resource management, radio access control, and mobility management. A core network device may include a management device and a gateway device. The management device is mainly for device registration, security authentication, mobility management, location management, and the like of the terminal device. The gateway device is mainly configured to: establish a channel to the terminal device, and forward a data packet between the terminal device and an external data network on the channel. The data network may include a network device (for example, a device such as a server or a router), and the data network is mainly for providing a plurality of data services for the terminal device. For example, an access network, a core network, and a data network in 5G are used as examples for description.

The access network in 5G may be a radio access network ((R)AN). A (R)AN device in a 5G system may include a plurality of 5G-(R)AN nodes. The 5G-(R)AN node may include an access point (AP) in a 3GPP access network or a non-3GPP access network such as a Wi-Fi network, a next-generation base station (which may be collectively referred to as a next-generation radio access network node (NG-RAN node), where the next-generation base station includes a new radio NodeB (gNB), a next-generation evolved NodeB (NG-eNB), a gNB in a form in which a central unit (CU) and a distributed unit (DU) are separated, and the like), a transmission reception point (TRP), a transmission point (TP), or another node.

The 5G core network (5GC/NGC) includes a plurality of functional units such as an access and mobility management function (AMF) network element, a session management function (SMF) network element, a user plane function (UPF) network element, an authentication server function (AUSF) network element, a policy control function (PCF) network element, an application function (AF) network element, a unified data management (UDM) function network element, a network slice selection function (NSSF) network element, and a network function (NEF) network element.

The AMF network element is mainly responsible for services such as mobility management, access management, and the like, for example, user location update, registration of a user with a network, and user handover. The SMF network element is mainly responsible for session management, a dynamic host configuration protocol function, selection and control of a user plane function, and the like, for example, session establishment, modification, and release. For example, specific functions are allocation of an IP address for the user and selection of a UPF network element that provides a packet forwarding function. The UPF network element is mainly responsible for functions related to an external connection to a data network (DN), user plane data packet routing and forwarding, packet filtering, quality of service (QOS) control, and the like, for example, forwarding and charging. The DN mainly provides a service for user equipment, for example, provides a mobile carrier service, an internet service, or a third-party service. The AUSF network element is mainly responsible for a function of authenticating the terminal device. The PCF network element is mainly responsible for providing a unified policy framework for network behavior management, providing a policy rule of a control plane function, and obtaining registration information related to policy decision, such as a QoS policy and a slice selection policy. It should be noted that these functional units may independently work, or may be combined to implement some control functions, such as access control and mobility management functions such as access authentication, security encryption, and location registration of the terminal device, and session management functions such as establishment, release, and change of a user plane transmission path. The UDM network element is used for unified user data management, and is mainly configured to store subscription data of user equipment, for example, store subscription information and authentication/authorization information. The AF network element is responsible for providing service-related information for a 3GPP network, for example, configured to affect service routing, interact with the PCF network element to perform policy control, and the like.

The functional units in the 5G system may communicate with each other through a next generation (NG) network interface. For example, the terminal device may transmit a control plane message to the AMF network element through an NG interface 1 (N1 for short). The RAN device may establish a user plane communication connection channel to the UPF network element through an NG interface 3 (N3 for short). The AN/RAN device may establish a control plane signaling connection to the AMF network element through an NG interface 2 (N2 for short). The UPF network element may exchange information with the SMF network element through an NG interface 4 (N4 for short). The UPF network element may exchange user plane data with the data network DN through an NG interface 6 (N6 for short). The AMF network element may exchange information with the SMF network element through an NG interface 11 (N11 for short). The SMF network element may exchange information with the PCF network element through an NG interface 7 (N7 for short). The AMF network element may exchange information with the AUSF network element through an NG interface 12 (N12 for short).

Figure 5:
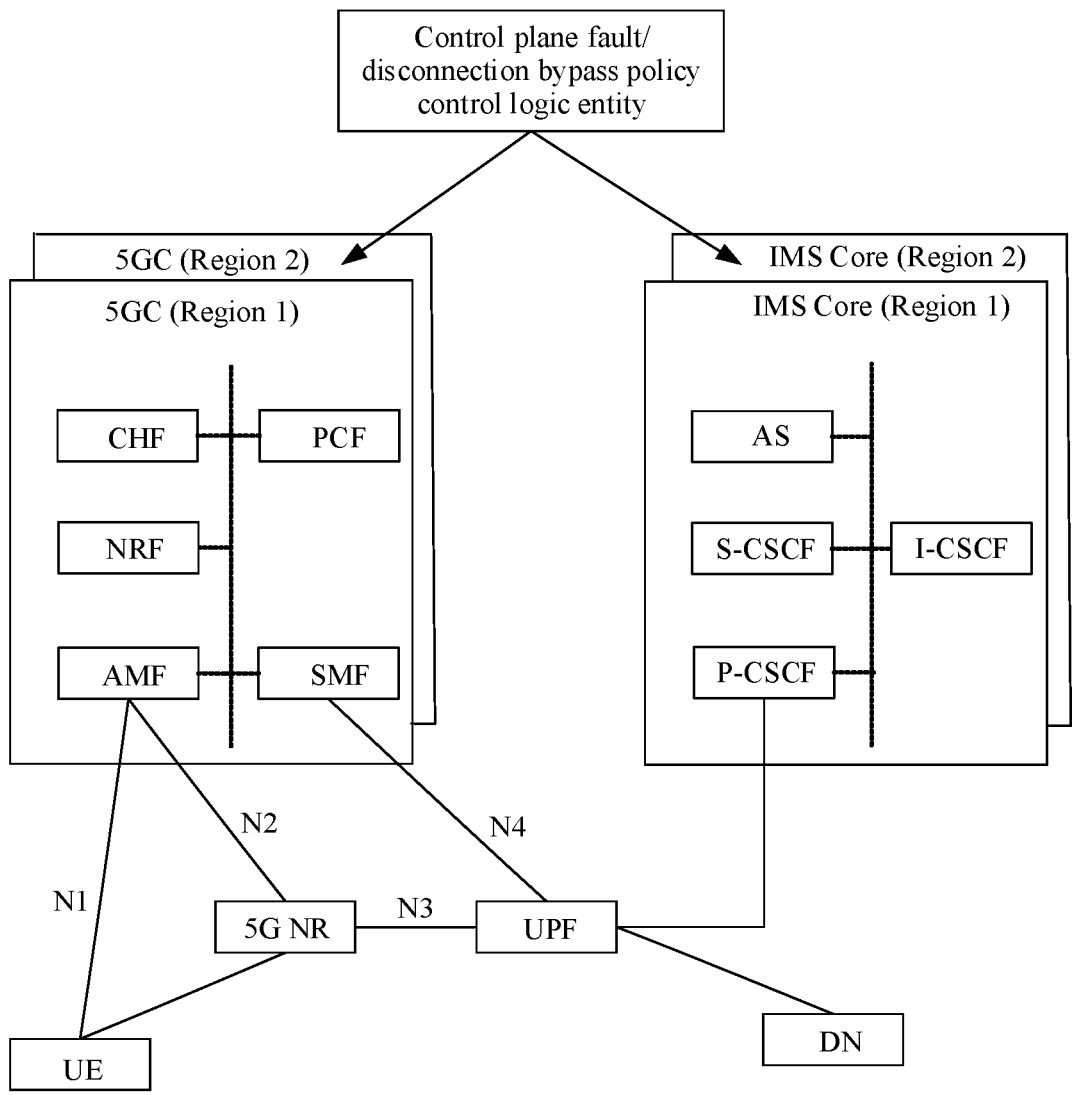
FIG. 5 is a schematic diagram of an architecture of an application scenario according to an embodiment of this application.

For example, FIG. 5 is a schematic diagram of an architecture of an application scenario according to an embodiment of this application. As shown in FIG. 5, in this embodiment of this application, a "control plane fault or disconnection bypass policy control logic entity" may be disposed. The control plane fault or disconnection bypass policy control logic entity may be disposed in a control plane network element in a 5GC, or may be disposed in a control plane network element in an IP multimedia subsystem (IMS) core network (Core). The control plane fault or disconnection bypass policy control logic entity may generate, based on a respective actual application scenario of the 5GC and/or the IMS core, an adaptive policy indicating a user plane to continue to run when a control plane is faulty or disconnected, and send the policy to the user plane, so that the user plane network element maintains continuity of a service of the user plane based on the policy when the user plane is disconnected from the control plane. Specific content of the policy and a policy delivery manner are described in a subsequent embodiment. Details are not described herein.

Figure 6:
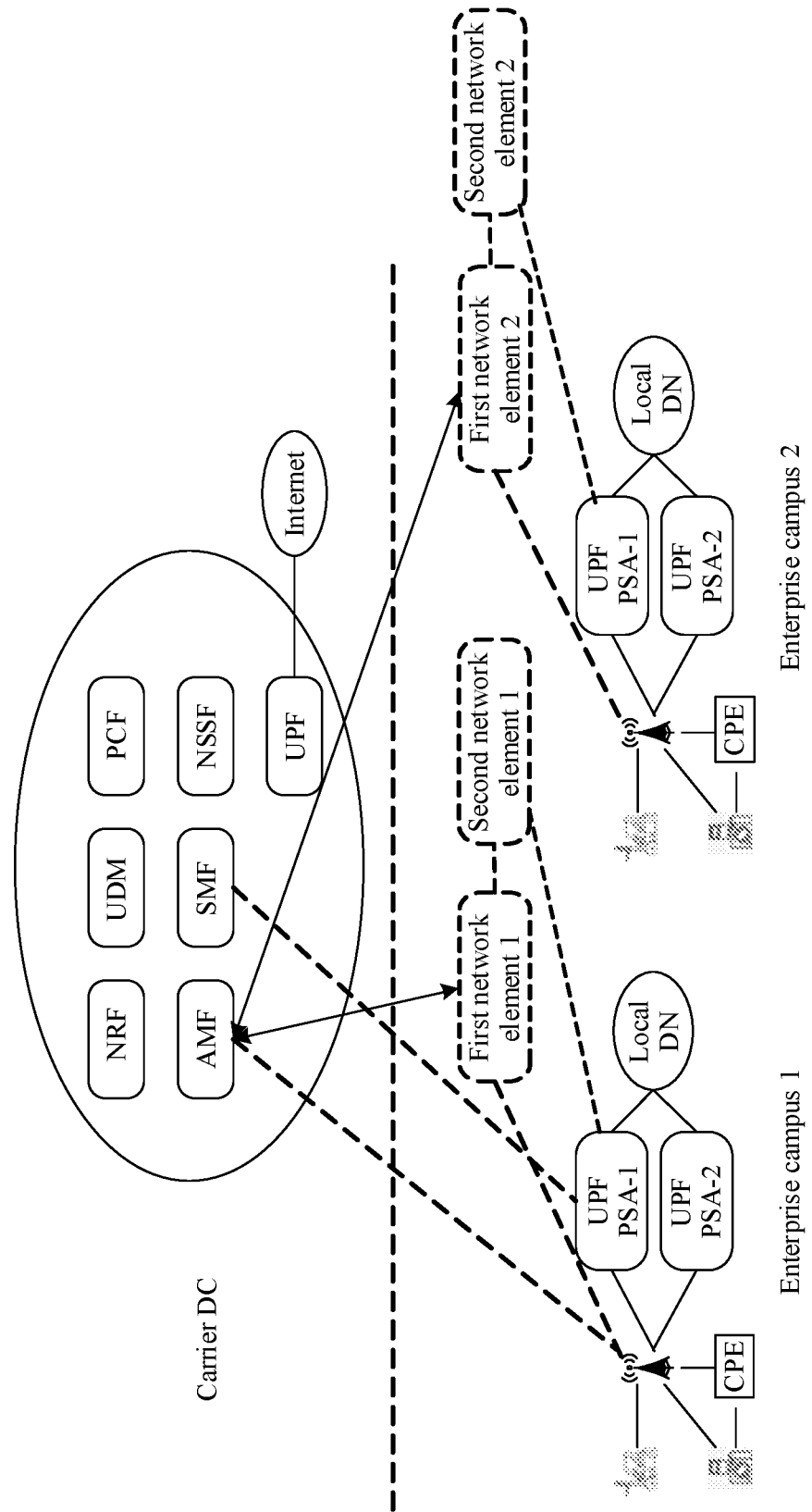
FIG. 6 is a schematic diagram of an architecture of another application scenario according to an embodiment of this application.

For example, FIG. 6 is a schematic diagram of an architecture of another application scenario according to an embodiment of this application. As shown in FIG. 6, an enterprise campus 1 and an enterprise campus 2 are separately connected to a 5GC of a carrier data center DC. In this embodiment of this application, a first network element may be separately disposed in each enterprise campus (or it may be understood as that the first network element is deployed in a physical location area to which a user plane network element belongs). The first network element may maintain a link connection to a base station, to maintain a normal activity of a session. The first network element may be a network element having a simple function. For example, the first network element may be an AMF edge (edge) network element (or may be referred to as a simplest AMF network element). The AMF edge network element may support a RAN side in maintaining a link reachable state, so that the RAN does not forcibly release a session when the RAN discovers that a link to an AMF network element of a data center DC control plane is disconnected. A subsequent new service request may be sent to the AMF edge network element. For example, the RAN may send the new service request to the AMF edge by planning solutions such as different link priorities, different capacities (capacities), link blocking/unblocking, and link weight factors (Weight Factors) of links between the RAN and the data center DC AMF and between the RAN and a campus AMF edge. At the same time, when discovering that a data center DC control plane network element is faulty/disconnected, another core network element surrounding the control plane supports sending the new service request to the first network element. For example, a backup AMF information (backupAmfInfo) parameter is extended, so that backupAmfInfo supports carrying information about the data center DC AMF network element and information about a backup campus AMF edge of the data center DC AMF network element. After the data center DC AMF is faulty and disconnected, the another core network element surrounding the control plane may send the new service request to the backup campus AMF edge based on the backupAmfInfo parameter. Specific content that the first network element may maintain a link connection to a base station is described in a subsequent embodiment. Details are not described herein again.

The data center DC AMF network element and the campus AMF edge may be planned in a same set (set). However, the campus AMF edge may choose not to register with a network repository function (NRF) network element in the 5GC of the center DC. Campus AMF edges may plan to use a same globally unique AMF identifier (GUAMI) or different GUAMIs (in this case, a new set needs to be planned for every 64 AMFs, and thus the data center DC AMF needs a capability of supporting a plurality of sets). The data center DC AMF network element and the campus AMF edge may alternatively be planned in different sets, or campus AMF edges are planned in different sets and plan to use different GUAMIs.

If campus AMF edges plan to use a same GUAMI, when users in different campuses roam between the campuses, a 32-bit T-IMSI in a GUTI (GUTI) may be selected for segmentation to avoid a case in which roaming determining cannot be performed on the users because globally unique temporary identities are repeated/crossed. Different temporary international mobile subscriber identities (T-IMSIs) are allocated to the different campuses. Alternatively, all related service procedures initiated by UE may be triggered to the UDM network element for authentication in the campus AMF edge, and a roaming attribute of the user is determined based on a temporary international mobile subscriber identity (IMSI) obtained during the authentication.

For example, as shown in FIG. 6, in this embodiment of this application, a second network element may be separately disposed in each enterprise campus (or it may be understood as that the second network element is deployed in the physical location area to which the user plane network element belongs). The second network element may maintain a link connection to the user plane network element, to maintain a normal activity of a session. The second network element may be a network element having a simple function. For example, the second network element may be an SMF edge (edge) network element (or may be referred to as a simplest SMF network element). The SMF edge network element may communicate with the first network element, to support the user plane network element side in maintaining a link reachable state, so that the user plane network element does not forcibly release a session when another control plane network element is disconnected. Specific content that the second network element may maintain a link connection to a base station is described in a subsequent embodiment. Details are not described herein again.

In a possible implementation, both the first network element and the second network element in FIG. 6 may be omitted. In this case, enhancement development may be performed on the RAN side, so that the RAN side does not actively release a radio resource control (RRC) connection when the user plane is disconnected from the control plane, to maintain continuity of a service of the user plane.

Figure 7:
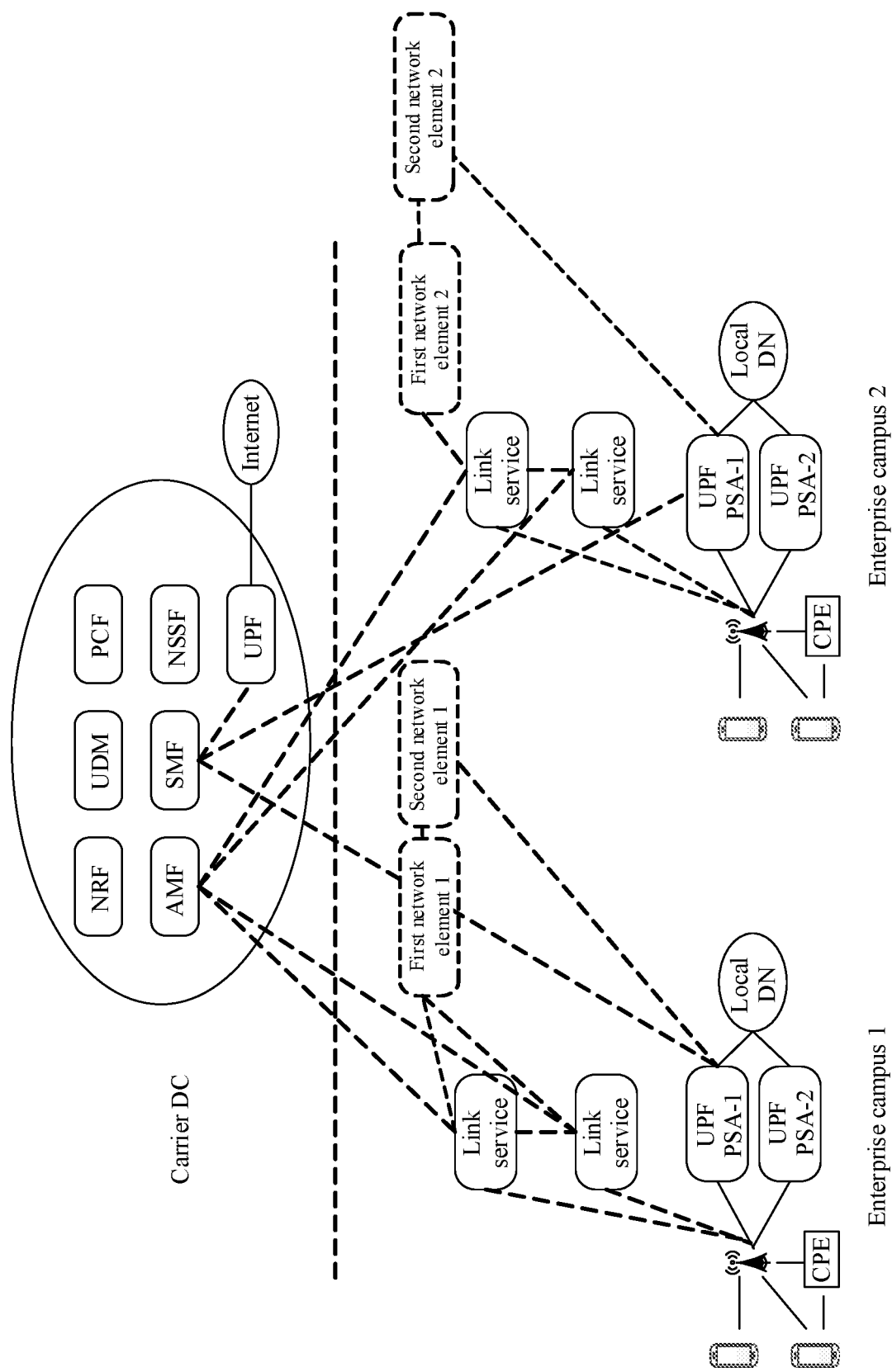
FIG. 7 is a schematic diagram of an architecture of another application scenario according to an embodiment of this application.

For example, FIG. 7 is a schematic diagram of an architecture of another application scenario according to an embodiment of this application. As shown in FIG. 7, a LINK link service (simplified as a link service in FIG. 7) responsible for interconnecting with a RAN N2 interface is remotely deployed from a data center DC to a campus. A RAN base station interconnects to a campus LINK link service. The RAN base station does not directly interconnect with a data center DC AMF network element. The campus LINK link service perceives a status of the data center DC AMF network element and a status of a campus AMF edge. When the campus LINK link service discovers that the LINK link service is disconnected from the data center DC AMF network element, the LINK link service sends a service message to the campus AMF edge, and the campus AMF edge takes over a GUAMI identity of the data center DC AMF network element and continues to process a service. The LINK link service may be co-deployed with the campus AMF edge. For example, a corresponding LINK link service may be deployed in both a first network element and a second network element. Options of specific solutions are as follows:
 1. The LINK link service interconnects with the RAN by using a 3GPP standard set protocol. A quantity of LINK link services corresponds to a quantity of data center DC AMF network elements. The LINK link service is deployed together with the campus AMF edge and functions as a proxy for an N2 interface service of the data center DC AMF network element. The LINK link service communicates with the data center DC AMF network element through a tunnel.
 2. The LINK link service interconnects with the RAN by using a single virtual network function (VNF). The LINK link service and the RAN may communicate with each other by using stream control transmission protocol (SCTP) dual-homing or multi-link. The data center DC AMF network element and the campus AMF edge form a large VNF, and the VNF crosses both the data center DC and the campus. Links are established between a plurality of different LINK link services on the campus. The plurality of LINK link services collaborate to detect the status of the data center DC AMF network element. The LINK link service communicates with the data center DC AMF network element through a tunnel.
 3. The LINK link service is defined as an independent VNF. Communication between the LINK link service and the data center DC AMF network element and communication between the LINK link service and the campus AMF edge are inter-network element communication. Links are planned and configured between the LINK link service and the RAN, between the LINK link service and the data center DC AMF network element, and between the LINK link service and the campus AMF edge.

For set ID or GUAMI planning of the data center DC AMF network element and the campus AMF edge, the following two options are available:
 1. The data center DC AMF network element allocates an independent GUAMI to each campus. When the LINK link service is disconnected from the data center DC AMF network element, the campus AMF edge takes over a GUAMI identity corresponding to the data center DC AMF network element and continues to process a service. In this case, a new set needs to be planned for every 64 AMF network elements, and thus the data center DC AMF network element needs a capability of supporting a plurality of sets.
 2. When taking over a service from the data center DC AMF network element, each campus multiplexes the GUAMI of the data center DC AMF network element. In addition, GUTIs need to be planned, most GUTIs are allocated to the data center DC AMF network element, and some GUTI number segments are reserved for each campus. After the campus is disconnected from the center, the campus AMF edge may use the reserved number segment in a scenario in which the campus AMF edge needs to allocate a GUTI when taking over and processing the service. After disconnection is recovered and the service is switched back to the data center DC AMF network element, reserved GUTI resources allocated to the campus during the disconnection and takeover need to be actively released, and GUTI number segment resources that are not reserved for the campus and that the data center DC AMF network element uses need to be reallocated.

In addition to interconnecting with the RAN, the data center DC AMF network element, and the AMF edge, the LINK link service needs to have at least the following functions:
 1. The LINK link service may function as a proxy for a plurality of GUAMI identities, and needs to maintain a correspondence between the GUAMI and the center AMF/campus AMF edge.
 2. The LINK link service supports parsing a non-access stratum (NAS) message, may identify the GUAMI and NG application protocol (NGAP) UE ID information, and supports forwarding a UE message to a corresponding data center DC AMF network element and campus AMF edge.
 3. The LINK link service supports processing a link-level message with the RAN, regardless of whether the message is an uplink message or a downlink message, and may summarize and merge response results and statuses of the data center DC AMF network element and the campus AMF edge.
 4. The LINK link service supports parsing a GUTI, and may accurately perform roaming determining when a user roams between different campuses or regions.

The following describes some terms in embodiments of this application.

A control plane network element described in embodiments of this application may be a network element configured to implement policy determining, such as an SMF network element, a PCF network element, a charging function (CHF) network element, or an AMF network element in a 5GC. This is not specifically limited in embodiments of this application.

Alternatively, the control plane network element described in embodiments of this application may be a proxy call session control function (P-CSCF) network element, a serving call session control function (S-CSCF) network element, an application server (AS), or the like in an IMS core. This is not specifically limited in embodiments of this application.

A user plane network element described in embodiments of this application may be a network element configured to implement a user plane function, such as a UPF network element. A first policy described in embodiments of this application indicates to maintain continuity of a service of a user plane when the user plane is disconnected from a control plane.

For example, disconnection between the user plane and the control plane may be disconnection at a device granularity, or may be disconnection at a session granularity. The disconnection between the user plane and the control plane may be caused by a control plane fault, or may be caused by the foregoing recorded natural disaster, network fault, or the like. The user plane network element may detect, in a manner of detecting a heartbeat between the user plane network element and the control plane network element, whether the user plane is disconnected from the control plane. Alternatively, the user plane network element may determine, based on indication information of another network element, whether the user plane is disconnected from the control plane. A specific form, a generation cause, and a detection manner of the disconnection between the user plane and the control plane are not specifically limited in embodiments of this application.

For example, the service of the user plane may be a protocol data unit (PDU) session (hereinafter referred to as a session) established in the user plane network element. Maintaining the continuity of the service of the user plane may include: not forcibly releasing the session established in the user plane network element, or it may be understood as maintaining an activity of the session in the user plane network element.

For example, the service of the user plane may alternatively be a call service in the IMS core, and maintaining the continuity of the service of the user plane may include: not forcibly releasing the call service.

A specific implementation of the first policy in the 5GC may be different from a specific implementation of the first policy in the IMS core.

For example, in the 5GC, the first policy may include one or more of the following possible implementations:

In a first possible implementation, the first policy is a policy indicating to continue to run, when the user plane is disconnected from the control plane, the service of the user plane. In a possible implementation, because the user plane is disconnected from the control plane, traffic may be incapable of being charged. Therefore, the first policy may also be understood as a policy indicating to allow, when the user plane is disconnected from the control plane, a user to use traffic free of charge, to keep the service of the user plane running. In this implementation, a limit amount of traffic used by the user free of charge may not be limited, and the service of the user plane keeps running.

In a second possible implementation, the first policy is a policy indicating to continue to run, when the user plane is disconnected from the control plane, the service of the user plane until the service of the user plane ends. In a possible implementation, because the user plane is disconnected from the control plane, traffic may be incapable of being charged. Therefore, the first policy may also be understood as a policy indicating to allow, when the user plane is disconnected from the control plane, a user to use traffic free of charge, to keep the service of the user plane running until the service of the user plane ends.

In a third possible implementation, the first policy is a policy indicating to continue to run, when the user plane is disconnected from the control plane, the service of the user plane until a connection between the control plane and the user plane is recovered. In a possible implementation, because the user plane is disconnected from the control plane, traffic may be incapable of being charged. Therefore, the first policy may also be understood as a policy indicating to allow, when the user plane is disconnected from the control plane, a user to use traffic free of charge, to keep the service of the user plane running until the connection between the control plane and the user plane is recovered.

In a fourth possible implementation, the first policy is a policy indicating to configure, when the user plane is disconnected from the control plane and a traffic quota of the user plane in a current period is used up, first duration and/or a first threshold of traffic for the service of the user plane, so that the service of the user plane continues to be run based on the first duration and/or the first threshold of traffic. In a possible implementation, the first policy may indicate to configure the first duration and/or the first threshold of traffic for the service of the user plane. Specific values of the first duration and the first threshold may be set based on an actual application scenario. This is not specifically limited in embodiments of this application. In this implementation, the first policy may further include: if a time limit of the first duration expires and a limit amount of the first threshold of traffic is used up, ending running of the service of the user plane (for example, releasing a session); if a time limit of the first duration expires and a limit amount of the first threshold of traffic is not used up, ending running of the service of the user plane (for example, releasing a session); or if a time limit of the first duration does not expire and a limit amount of the first threshold of traffic is used up, ending running of the service of the user plane (for example, releasing a session). This is not specifically limited in embodiments of this application.

In a fifth possible implementation, the first policy is a policy indicating to continue to run, when the user plane is disconnected from the control plane and use time of a traffic quota of the user plane in a current period expires, the service of the user plane until the traffic quota of the user plane in the current period is used up. In this implementation, the traffic quota of the user plane in the current period is not only limited by a traffic limit amount, but also limited by the use time. When the use time of the traffic quota in the current period expires, the service of the user plane may still continue to be run until the traffic quota of the user plane in the current period is used up, so that the continuity of the service of the user plane can be maintained to some extent.

It may be understood that a specific implementation of the first policy in the 5GC may alternatively be set based on an actual application scenario. This is not specifically limited in embodiments of this application. In a possible implementation, in 5GC communication, different implementations of the first policy may be defined as different enumerated values. For indicating the first policy, the enumerated value may be transferred, and the first policy itself does not need to be transferred. Because the enumerated value occupies fewer resources, defining the first policy as an enumerated value can save communication resources.

For example, in the IMS core, the first policy may be: disabling a session control timer mechanism. The session control timer mechanism may be a session timer mechanism in a protocol. For example, the session timer mechanism may be understood as follows: After a session is established, a terminal or a network element periodically initiates a session update request to a peer end, and a terminal and a network element in a same session can detect a status of another device in time. When the terminal or any network element in the IMS core is faulty, the session can be released in time to avoid occupying network resources. If the session timer mechanism is disabled, the user plane network element may indicate the terminal device not to periodically initiate a request to the control plane network element, to avoid a case in which a call is forcibly released after being detected by the session timer mechanism and after an IMS core control plane is faulty/disconnected.

An inactive mode described in embodiments of this application may be an inactive mode in a protocol. In a possible understanding manner, in the inactive mode, the terminal device still remains in a communication connected mode, and UE may move in a RAN area without notifying a CN. When the terminal device is in the inactive mode, a last 5G serving base station (gNB) retains a context of the terminal device and NG connections that are associated with the terminal device and that are to a serving AMF network element and UPF network element. From a perspective of a core network, the terminal device is in a connected mode.

A radio access network device described in embodiments of this application may be a base station or the like.

A first radio access network device described in embodiments of this application may be a last radio access network device that serves communication between the terminal device and the user plane network element before the user plane is disconnected from the control plane.

A second radio access network device described in embodiments of this application may be a radio access network device that serves communication of the terminal device after the user plane is disconnected from the control plane.

By using specific embodiments, the following describes in detail the technical solutions of this application and how to resolve the foregoing technical problem by using the technical solutions of this application. The following several specific embodiments may be implemented independently or combined with each other, and same or similar concepts or processes may not be repeatedly described in some embodiments.

Figure 8:
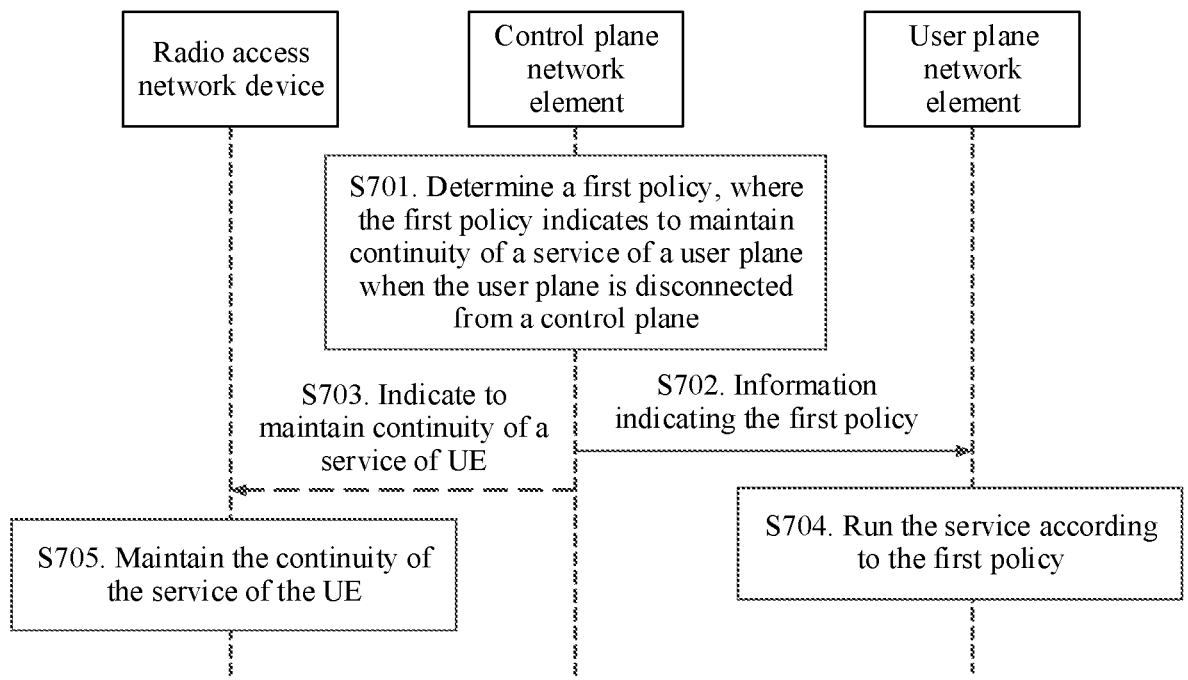
FIG. 8 is a schematic flowchart of a communication method according to an embodiment of this application.

FIG. 8 is a schematic flowchart of a communication method according to an embodiment of this application. The method includes the following steps.

S701. A control plane network element determines a first policy, where the first policy indicates to maintain, when a user plane is disconnected from the control plane, continuity of a service of the user plane.

In this embodiment of this application, the control plane network element may determine the first policy when the service of the user plane is initiated.

For example, when the control plane network element is a network element in a 5GC, the control plane network element may determine the first policy for a PDU session when a terminal device initiates a PDU session establishment request. For example, the control plane network element may determine, based on information such as different terminal devices, different data network names (DNNs), different service types, or different package users corresponding to the PDU session, whether the PDU session has a high requirement on service continuity. If the PDU session has a high requirement on service continuity, the control plane network element may determine the first policy for the PDU session. For example, the control plane network element may determine, based on policy control information indicated by a PCF network element for the PDU session and traffic quota information indicated by a CHF network element for the PDU session, whether the PDU session has a high requirement on service continuity. If the PDU session has a high requirement on service continuity, the control plane network element may determine the first policy for the PDU session. A specific basis for determining the first policy by the control plane network element is not limited in this embodiment of this application.

For example, when the control plane network element is a network element in an IMS core, the control plane network element may determine, based on information such as different terminal devices, different data network names (DNNs), different service types, or different package users corresponding to a call service, whether the call service has a high requirement on service continuity. If the call service has a high requirement on service continuity, the control plane network element may determine the first policy for the call service. A specific basis for determining the first policy by the control plane network element is not limited in this embodiment of this application.

For specific indication content of the first policy in this embodiment of this application, refer to the foregoing explanations. Details are not described herein again.

S702. The control plane network element sends, to the user plane network element, information indicating the first policy.

In this embodiment of this application, the control plane network element may send, to the user plane network element by using a newly defined message indicating the first policy, the information indicating the first policy. Alternatively, the control plane network element may include, in an existing message, the information indicating the first policy. Alternatively, the control plane network element may indicate the first policy by not including some information in an existing message.

For example, when the control plane network element is a network element in the 5GC, the control plane network element may include, in a session establishment or modification request (session establishment/modification request) message, the message indicating the first policy.

For example, when the control plane network element is a network element in the IMS core, the control plane network element may not include, in a message such as 200 OK sent to the user plane network element, header fields such as session-expires and min-SE that are related to a session timer mechanism, and the user plane network element may not include, in the message such as 200 OK forwarded to the terminal device, the header fields such as session-expires and min-SE that are related to the session timer mechanism, so that the session timer mechanism can be disabled and continuity of the service of the user plane can be maintained.

S703. The control plane network element indicates a radio access network device to maintain continuity of a service of the terminal device.

In this embodiment of this application, the control plane network element may indicate the radio access network device to keep the terminal device in a connected mode, to maintain the continuity of the service of the terminal device.

For example, when the control plane network element is a network element in the 5GC, the control plane network element may indicate the radio access network device to start an inactive mode mechanism for the terminal device.

Subsequently, the radio access network device may also retain a context of the terminal device and content associated with the terminal device based on a last serving gNB, to maintain the continuity of the service of the terminal device.

For example, when the control plane network element is a network element in the IMS core, the control plane network element may forward a 200 OK message via the user plane network element. The 200 OK message does not carry header fields such as Session-Expires and Min-SE that are related to the session timer mechanism, so that the session timer mechanism can be disabled and the continuity of the service of the terminal device can be maintained.

S704. The user plane network element runs the service according to the first policy.

S705. The radio access network device maintains the continuity of the service of the terminal device.

In this embodiment of this application, in S704 and S705, both the user plane network element and the radio access network device receive an indication for maintaining the continuity of the service of the user plane when the user plane is disconnected from the control plane. Subsequently, the user plane network element and the radio access network device may maintain the continuity of the service of the user plane in any manner when the user plane is disconnected from the control plane. This is not specifically limited in this embodiment of this application.

In conclusion, when the user plane is disconnected from the control plane, in this embodiment of this application, the control plane network element may determine the first policy indicating to maintain the continuity of the service of the user plane when the user plane is disconnected from the control plane, and deliver the first policy to the user plane network element and the radio access network device. In this case, when the user plane is subsequently disconnected from the control plane, the user plane network element and the radio access network device can maintain the continuity of the service of the user plane, to avoid service discontinuity caused by a control plane fault/communication disconnection.

Figure 9:
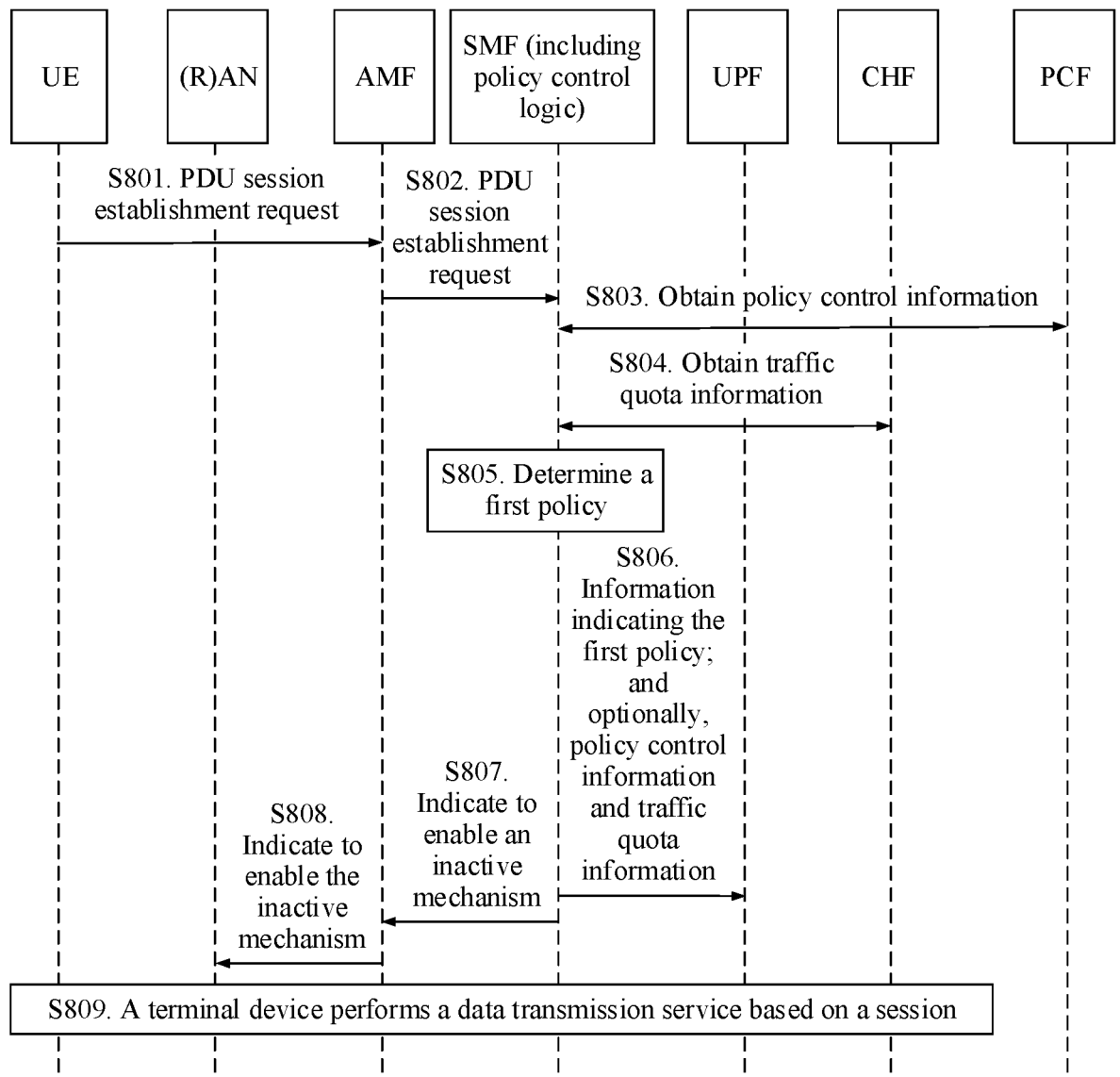
FIG. 9 is a schematic flowchart of a communication method according to an embodiment of this application.

Based on the embodiment corresponding to FIG. 8, FIG. 9 is a schematic flowchart of a specific communication method according to an embodiment of this application. As shown in FIG. 9, in this embodiment of this application, an example in which a control plane network element is an SMF network element in a 5GC (or it may be understood as that policy control logic for implementing first policy determining in this embodiment of this application is executed by an SMF network element) is used to describe a same method in this embodiment of this application.

It may be understood that if the policy control logic acts on a CHF network element, a PCF network element, an AMF network element, or a UPF network element in the 5GC, not only an N4 interface signaling parameter is extended, but also information indicating a first policy may be transferred between a corresponding SMF network element and the CHF network element, the PCF network element, the AMF network element, or the UPF network element based on a protocol. For example, the information indicating the first policy may be transferred by an using one or more of the following messages: Nchf_ConvergedCharging_Create_Response message, an Nchf_ConvergedCharging_Notify message, an Npcf_SMPolicyControl_Create_Response message, an Npcf_SMPolicyControl_UpdateNotify message, or the like. Details are not described herein.

For example, the communication method shown in FIG. 9 may include the following steps.

S801. A terminal device sends a session establishment request to an AMF network element.

For example, the terminal device may initiate a PDU session establishment request to the AMF network element via a RAN. For example, the terminal device may send an N2 message to the RAN, where the N2 message may carry an N2 Message (which may also be referred to as a Service Request), and the N2 Message carries session establishment request information. For example, the N2 Message (Service Request) carries a PDU Session Establishment Request message.

S802. The AMF network element sends the session establishment request to an SMF network element.

For example, the AMF network element may send an N11 message to the SMF network element, where the N11 message carries a session establishment request instruction. For example, the N11 message carries Nsmf_PDUSession_UpdateSMContext Request.

S803. The SMF network element obtains policy control information of a session from a PCF network element.

In this embodiment of this application, the policy control information of the session may be determined by the PCF based on a common policy determining manner. For example, the policy control information of the session may indicate an access technology, a communication link, or the like of the session. This is not specifically limited in this embodiment of this application.

S804. The SMF network element obtains traffic quota information from a CHF network element.

For example, the SMF network element may send a ChargingDataRequest request to the CHF network element to obtain the traffic quota information. The traffic quota information may indicate that a session service needs to be run when a traffic quota is not used up.

S805. The SMF network element determines a first policy.

In this embodiment of this application, for a specific implementation of S805, refer to the descriptions of determining the first policy by the control plane network element in the 5GC in S701. Details are not described herein again.

S806. A UPF network element receives, from the SMF network element, information indicating the first policy, and optionally, the policy control information of the session and the traffic quota information.

In this embodiment of this application, for a specific implementation of S806, refer to the descriptions of receiving, by the user plane network element in the 5GC, the information indicating the first policy in S702. Details are not described herein again.

S807. The SMF network element indicates the AMF network element to enable an inactive mechanism.

For example, the SMF network element may return, to the AMF network element, an Nsmf_PDUSession_UpdateSMContext Response response carrying a parameter indicating that the AMF network element can enable the inactive mechanism.

S808. The AMF network element indicates the RAN to enable the inactive mode mechanism for the terminal device.

For example, the AMF network element may include RRC Inactive assistance information in an N2 Request message sent to the RAN/terminal device, to notify the RAN to enable the inactive mode mechanism for the terminal device.

S809. The terminal device performs a data transmission service based on the session.

In this embodiment of this application, after a PDU session is established, the terminal device may perform the data transmission service with the UPF network element.

In a possible implementation, if a traffic quota of the terminal device in a current period is about to be used up, the terminal device may report a PFCP Session Report Request to the SMF network element. The SMF network element may send an Nchf_ConvergedCharging_Update message to the CHF network element to report used traffic. The CHF network element may deliver a new quota to the SMF network element. The SMF network element delivers, to the UPF network element by using a packet forwarding control protocol (PFCP) Session Modification Request message, the traffic quota re-delivered by the CHF network element.

In this embodiment of this application, when the user plane is disconnected from the control plane, the control plane network element may determine the first policy, and deliver the first policy to the user plane network element. In this case, when subsequently running a service according to the first policy, the user plane network element may maintain, based on an indication of the first policy, continuous running of the service of the user plane when the user plane is disconnected from the control plane, to avoid service discontinuity caused by a control plane fault/communication disconnection.

Figure 10:
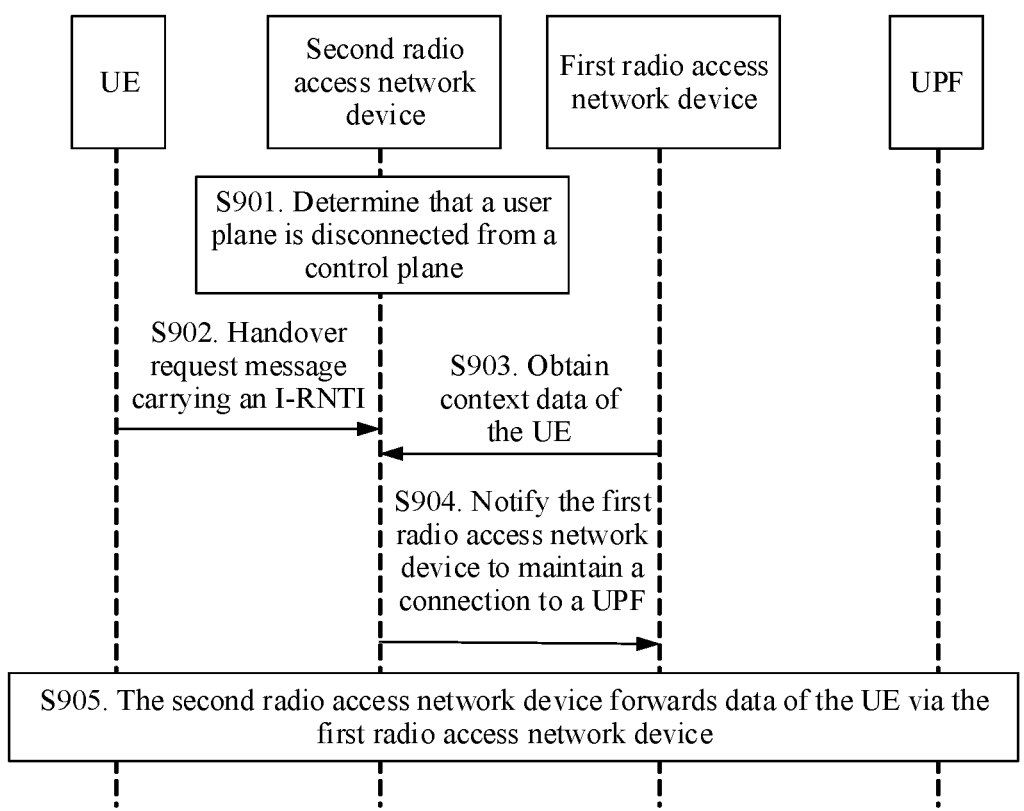
FIG. 10 is a schematic flowchart of a communication method according to an embodiment of this application.

Based on FIG. 8 or FIG. 9, FIG. 10 is a schematic flowchart of a specific communication method according to an embodiment of this application. As shown in FIG. 10, the communication method may be a schematic communication diagram of maintaining continuity of a service of a user plane after the user plane is disconnected from a control plane. Specifically, the following may be included.

S901. A second radio access network device determines that the user plane is disconnected from the control plane.

In this embodiment of this application, the second radio access network device may be a base station or the like that serves a terminal device after the user plane is disconnected from the control plane. The second radio access network device may perceive by itself, based on an indication of another network element, that the user plane is disconnected from the control plane. This is not specifically limited in this embodiment of this application.

Further, the second radio access network device may maintain the continuity of the service of the user plane when the user plane is disconnected from the control plane. For example, after perceiving that the user plane is disconnected from the control plane, the second radio access network device may not forcibly release a session. When receiving a handover request message from a terminal device, the second radio access network device does not send the handover request message to a 5GC either, but only completes, at a radio access network side, air interface handover between base stations that serve the terminal, to maintain the continuity of the service of the user plane. For example, S902 to S905 show a possible implementation in which the second radio access network device maintains the continuity of the service of the user plane when the user plane is disconnected from the control plane.

S902. The second radio access network device receives the handover request message from the terminal device, where the handover request message may carry an inactive radio network temporary identifier (I-RNTI).

In this embodiment of this application, when the terminal device moves across building baseband units (BBUs), the terminal device needs to exchange handover signaling with the control plane. The terminal device may send the handover request message to the second radio access network device, and the second radio access network device (which may also be referred to as a new base station) may parse the I-RNTI to obtain information about a first radio access network device. The first radio access network device (which may also be referred to as an old base station) may be a last radio access network device that serves the terminal device before the user plane is disconnected from the control plane.

S903. The second radio access network device obtains context data of the terminal device from the first radio access network device, and the second radio access network device may recover an RRC connection to the terminal device based on the context data.

In a possible implementation, to prevent loss of downlink data previously cached in the first radio access network device, the second radio access network device may further provide a forwarding address for the first radio access network device, to obtain the downlink data from the first radio access network device.

S904. The second radio access network device notifies the first radio access network device to maintain a connection to a UPF network element.

In this embodiment of this application, the UPF network element still maintains a channel connection to the first radio access network device, and uplink or downlink data of the terminal device may be subsequently forwarded through an Xn interface between the second radio access network device and the first radio access network device, to implement the continuity of the service of the user plane.

S905. The second radio access network device forwards the data of the terminal device via the first radio access network device.

In this embodiment of this application, the second radio access network device may provide a service for the terminal device, the first radio access network device maintains the channel connection to the UPF network element, and the second radio access network device may communicate with the first radio access network device through the Xn interface. Therefore, both uplink and downlink data of the terminal device may be forwarded through the Xn interface between the second radio access network device and the first radio access network device, to implement the continuity of the service of the user plane.

In this embodiment of this application, after perceiving that the user plane is disconnected from the control plane, the second radio access network device may maintain the continuity of the service of the user plane based on communication with the first radio access network device.

In a possible understanding manner, in the embodiment corresponding to FIG. 10, enhancement development may be performed on a radio access network device, so that the radio access network device does not actively release an RRC connection when the radio access network device determines that the control plane is faulty or disconnected (for example, there is no available AMF network element), to maintain the continuity of the service of the user plane. For example, when PathSwitch interaction between the second radio access network device and the AMF network element fails, the second radio access network device does not actively release the RRC connection, and the first radio access network device temporarily maintains the connection to the UPF network element. During a fault period, forwarding the uplink or downlink data through the Xn interface between the first radio access network device and the second radio access network device is supported, so that the continuity of the service of the user plane can be maintained.

Figure 11:
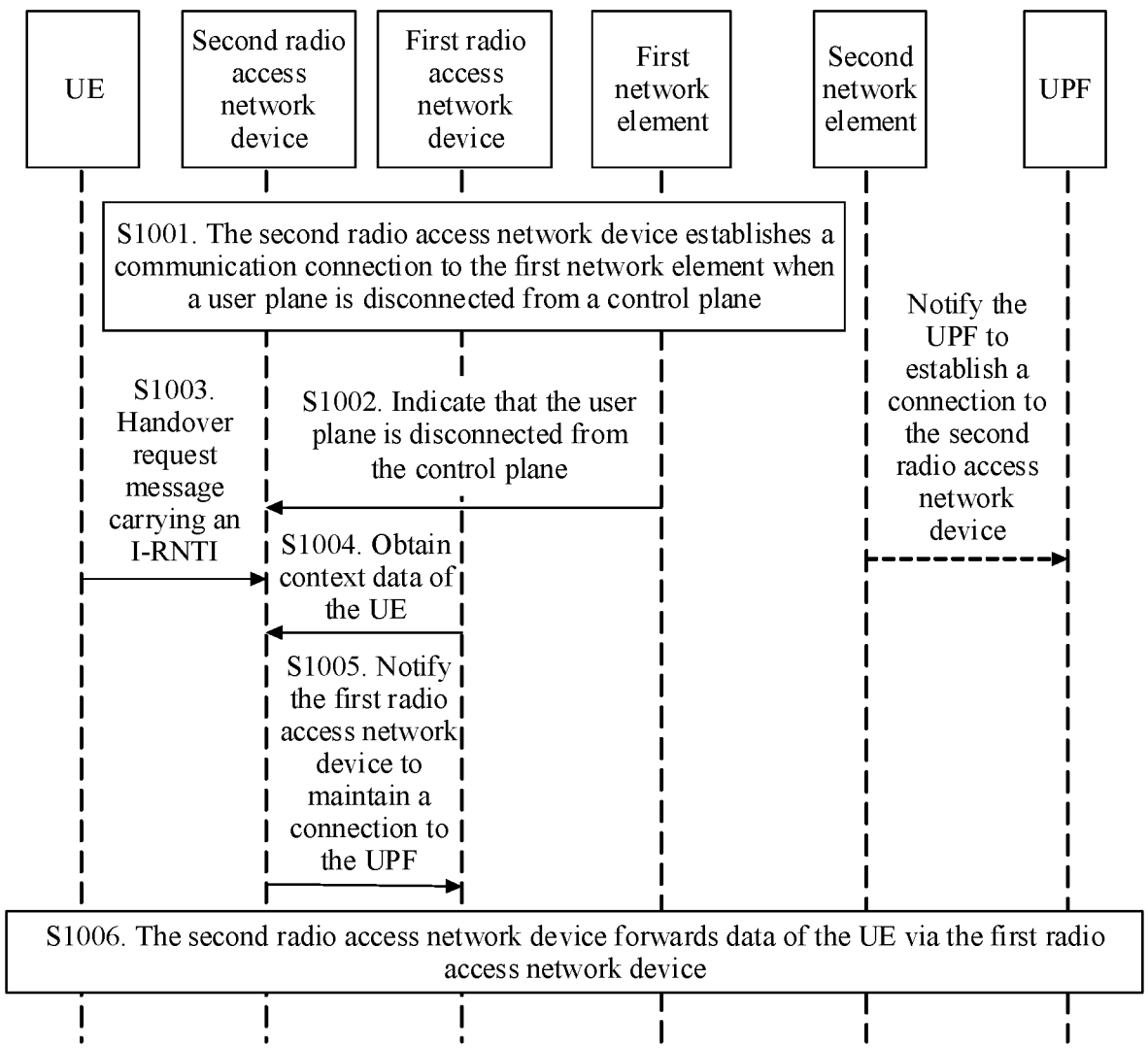
FIG. 11 is a schematic flowchart of a communication method according to an embodiment of this application.

Based on FIG. 8 or FIG. 9, FIG. 11 is a schematic flowchart of a specific communication method according to an embodiment of this application. As shown in FIG. 11, the communication method may be a schematic communication diagram of maintaining continuity of a service of a user plane after the user plane is disconnected from a control plane. Specifically, the following may be included.

S1001. A second radio access network device establishes a communication connection to a first network element when a user plane is disconnected from a control plane.

In this embodiment of this application, the first network element may be disposed in a campus. The first network element may be a network element (for example, an AMF edge network element) that is separately disposed and that is configured to implement a simple AMF, or may be a network element that is co-disposed with another network element and that is configured to implement a simple AMF. This is not specifically limited in this embodiment of this application.

In this embodiment of this application, the second radio access network device may establish the communication connection to the first network element when the user plane is disconnected from the control plane. For example, when the user plane is disconnected from the control plane, the second radio access network device may send a request to the first network element, where the request is used to request to establish the communication connection between the second radio access network device and the first network element.

S1002. The first network element indicates, to the second radio access network device, that the user plane is disconnected from the control plane.

For example, the first network element may send a cause value to the second radio access network device, to indicate a RAN side that the user plane is disconnected from the control plane currently.

In this embodiment of this application, after the user plane is disconnected from the control plane, a campus UPF network element may not actively delete a session or release an N3 connection to the RAN side, to maintain a connection to a first radio access network device.

S1003. The second radio access network device receives a handover request message from a terminal device, where the handover request message may carry an inactive radio network temporary identifier (I-RNTI).

S1004. The second radio access network device obtains context data of the terminal device from the first radio access network device, and the second radio access network device may recover an RRC connection to the terminal device based on the context data.

S1005. The second radio access network device notifies the first radio access network device to maintain the connection to the UPF network element.

S1006. The second radio access network device forwards the data of the terminal device via the first radio access network device.

In this embodiment of this application, for S1003 to S1006, refer to the descriptions of S901 to S905 in the embodiment corresponding to FIG. 10. Details are not described herein again.

In this embodiment of this application, the first network element may be disposed in the campus, and the first network element indicates the user plane network element to maintain service continuity.

In a possible implementation, when the first network element is the AMF edge network element, and communication between the user plane and the control plane is recovered, the AMF edge network element may synchronize, to an AMF network element in a 5GC control plane, data generated in the AMF edge network element during disconnection between the user plane and the control plane.

In a possible implementation, based on a requirement of an enterprise campus, a second network element (for example, an SMF edge network element disposed in the campus) may be further deployed in the enterprise campus. In this case, the second radio access network device may communicate with the AMF edge network element, the AMF edge network element may communicate with the SMF edge network element, and the SMF edge network element may communicate with the UPF network element. In a possible implementation, as shown in FIG. 11, the SMF edge network element may indicate the UPF network element to establish a connection to the second radio access network device, to implement service communication between the terminal device and the UPF network element.

If the AMF edge network element and the SMF edge network element are deployed in the enterprise campus, when the user plane is disconnected from the control plane, handover of the terminal device may be supported, a service initiated by a terminal device in an idle mode may be supported, the terminal device may be supported in going online again after disconnection from a network or power-off, or the like.

In a possible implementation, when the second network element is the SMF edge network element, and communication between the user plane and the control plane is recovered, the SMF edge network element may synchronize, to the SMF network element in a 5GC control plane, data generated in the SMF edge network element during disconnection between the user plane and the control plane.

In a possible implementation, a UDM Edge, an AUSF Edge, or the like may be further deployed in the enterprise campus. In this case, when the user plane is disconnected from the control plane, a terminal device that accesses a network may be further supported in registering with the access network, or the like.

In a possible implementation, if the campus has a requirement for a location service with a low latency, the location service may be further implemented by the AMF edge network element. Because the AMF edge network element is disposed in the campus, a data transmission path is short when the location service is implemented. Compared with implementing the location service by using a center DC AMF network element, implementing the service by using the AMF edge network element can effectively reduce a latency. In a possible implementation, user data may be synchronized between the center DC AMF network element and the AMF edge network element. After a campus user plane is disconnected from a center DC, the AMF edge network element may continue to cooperate with a gateway mobile location center (GMLC) or a location management function (LMF) to provide the location service (where the GMLC or the LMF may be co-deployed in a campus edge UPF or MEC).

In a possible implementation, when the user plane is disconnected from the control plane, the terminal device initiates a new service, and the AMF edge network element may return a failure response, to trigger UE to fall back to a network such as a public network or a 4G/3G/2G network that is not disconnected.

It should be noted that, in the embodiment corresponding to FIG. 11, a scenario in which long-distance communication with the data center DC is interrupted is described by using the enterprise campus as an example. However, in a public cloud service deployment scenario, there is a similar network interruption scenario and solution. A difference lies in that the AMF edge may be selected and deployed on a third-party public cloud, and a UPF may also be deployed on the public cloud (for example, a UPF is deployed on a public cloud corresponding to a roaming location to facilitate local access).

Figure 12:
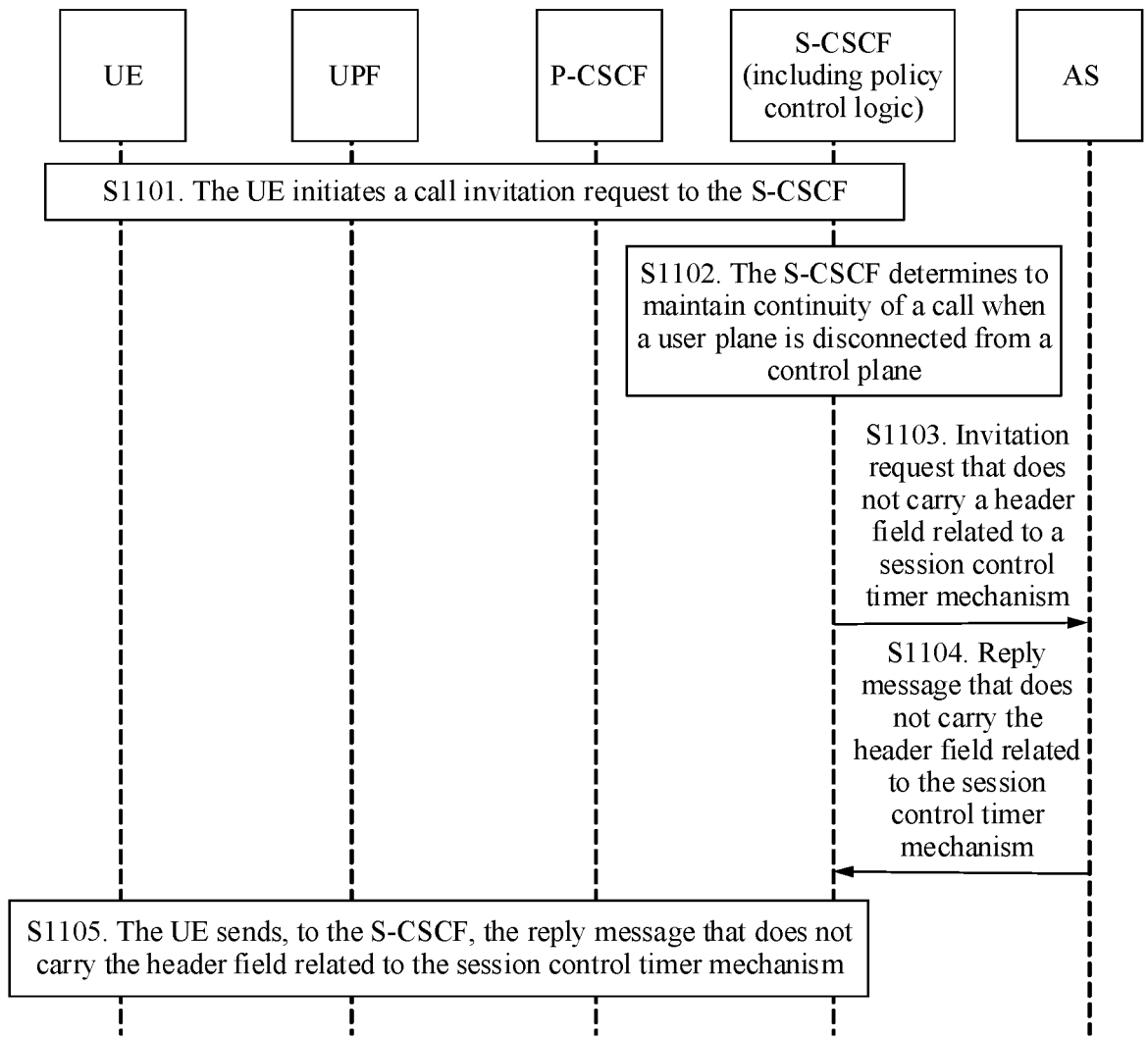
FIG. 12 is a schematic flowchart of a communication method according to an embodiment of this application.

FIG. 12 is a schematic flowchart of a communication method according to an embodiment of this application. As shown in FIG. 12, in this embodiment of this application, an example in which a control plane network element is an S-CSCF network element in an IMS core (or it may be understood as that policy control logic for implementing first policy determining in this embodiment of this application is executed by an S-CSCF network element) is used to describe a same method in this embodiment of this application.

As shown in FIG. 12, the method may include the following steps.

S1101. The S-CSCF network element receives a call invitation request from a terminal device.

In this embodiment of this application, the terminal device may send the call invitation request to the S-CSCF network element via a UPF network element and a P-CSCF network element.

For example, for a VOLTE/VoNR call service, the terminal device may include a Session-Expires header field in the call invitation (INVITE) request when initiating the call invitation (INVITE) request, to indicate to perform Session Timer detection after a session is established. For example, the terminal device may send the call invitation request to the UPF network element, the UPF network element forwards the call invitation request to the P-CSCF network element, and the P-CSCF network element sends the call invitation request to the S-CSCF network element.

S1102. The S-CSCF network element determines to maintain continuity of a call when a user plane is disconnected from a control plane.

In this embodiment of this application, the S-CSCF network element may determine, based on information such as different terminal devices, different data network names (DNNs), different service types, or different package users corresponding to a call service, whether the call service has a high requirement on service continuity. If the call service has a high requirement on service continuity, the S-CSCF network element may determine, for the call service, to maintain continuity of the call when the user plane is disconnected from the control plane. This is not limited in this embodiment of this application.

In a possible implementation, the S-CSCF network element may determine not to enable a session timer mechanism, to avoid a case in which the call is forcibly released subsequently after being detected by the session timer mechanism and after an IMS core control plane is faulty/disconnected.

S1103. The S-CSCF network element sends, to an AS, an invitation request that does not carry a header field related to a session control timer mechanism.

S1104. The AS sends, to the S-CSCF network element, a reply message that does not carry the header field related to the session control timer mechanism.

For example, the AS may send, to the S-CSCF network element, a 200 OK message that does not carry the header field related to the session control timer mechanism.

S1105. The S-CSCF network element sends, to the terminal device, the reply message that does not carry the header field related to the session control timer mechanism.

For example, the S-CSCF network element may send, to the P-CSCF network element, the 200 OK message that does not carry the header field related to the session control timer mechanism, the P-CSCF network element may send, to the UPF network element, the 200 OK message that does not carry the header field related to the session control timer mechanism, and the UPF network element may send, to the terminal device, the 200 OK message that does not carry the header field related to the session control timer mechanism. In conclusion, in an IMS core, the session timer mechanism may be disabled, so that continuity of a service of the user plane is maintained when the user plane is disconnected from the control plane, to avoid service discontinuity caused by a control plane fault/communication disconnection.

Based on the embodiments corresponding to FIG. 8 to FIG. 12, in a possible implementation, the user plane network element may further determine traffic usage of the service run during disconnection between the user plane and the control plane; and the user plane network element sends the traffic usage to the control plane network element when a connection between the control plane and the user plane is recovered.

For example, the UPF network element may also perform, based on a requirement of a carrier customer, accumulation statistics collection on excess traffic used by a user during a fault period. After the control plane recovers, the UPF network element supplementally reports accumulated traffic to the SMF network element or the CHF network element by using a report message. A special identifier may be added to a related interface message, so that the SMF network element or the CHF network element processes the excess traffic.

Based on the embodiments corresponding to FIG. 8 to FIG. 12, in a possible implementation, when the service of the user plane network element is not run for more than second duration (which may be set based on an actual application scenario), checking of resource usage of the user plane network element is triggered; when a resource usage rate of the user plane network element exceeds a threshold, checking of resource usage of the user plane network element is triggered; or when the connection between the control plane and the user plane is recovered, checking of resource usage of the user plane network element is triggered.

In this embodiment of this application, when the user plane is disconnected from the control plane, the user plane keeps the service running. To prevent a user plane resource from being hung-up (which may be understood as that the user plane resource is occupied and cannot be released in time), the checking of resource usage of the user plane network element may be triggered when the service of the user plane network element is not run for a long time, the resource usage rate of the user plane network element is high, or the connection between the user plane and the control plane is recovered. In this way, the resource of the user plane network element is properly released. In specific implementation, the resource of the user plane network element may alternatively be forcibly released in a manual manner. This is not specifically limited in this embodiment of this application.

The foregoing describes the methods in embodiments of this application with reference to FIG. 8 to FIG. 12. The following describes a communication apparatus that is provided in embodiments of this application and that performs the foregoing methods. A person skilled in the art may understand that the method and the apparatus may be mutually combined and referenced. A communication apparatus provided in embodiments of this application may perform the steps performed by the user plane network element in the foregoing communication methods. Another communication apparatus may perform the steps performed by the control plane network element in the communication methods in the foregoing embodiments.

Descriptions are provided below by using an example in which functional modules are obtained through division based on corresponding functions.

Figure 13:
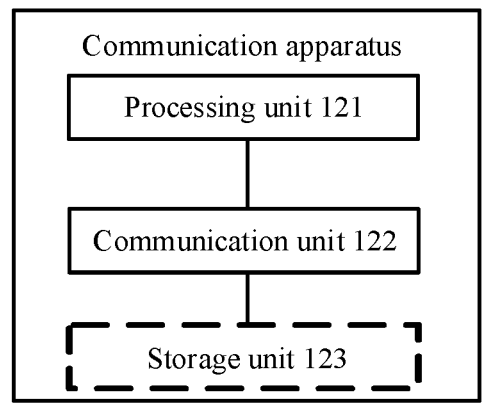
FIG. 13 is a schematic diagram of a structure of a communication apparatus according to an embodiment of this application.

FIG. 13 is a schematic diagram of a structure of a communication apparatus according to an embodiment of this application. The communication apparatus may be a user plane network element, a control plane network element, a second radio access network device, or a first network element in embodiments of this application, or may be a chip used in the user plane network element, the control plane network element, the second radio access network device, or the first network element. The communication apparatus includes a processing unit 121 and a communication unit 122. The communication unit 122 is configured to support the communication apparatus in performing a step of sending or receiving information. The processing unit 121 is configured to support the communication apparatus in performing a step of processing information.

In an example, the communication apparatus is a user plane network element or a chip or a chip system used in the user plane network element. The communication unit 122 is configured to support the communication apparatus in performing S702 and the like in the foregoing embodiments. The processing unit 121 is configured to support the communication apparatus in performing S704 and the like in the foregoing embodiments.

In an example, the communication apparatus is a control plane network element or a chip or a chip system used in the control plane network element. The communication unit 122 is configured to support the communication apparatus in performing S702 and the like in the foregoing embodiments. The processing unit 121 is configured to support the communication apparatus in performing S703 and the like in the foregoing embodiments.

In another example, the communication apparatus is a second radio access network device or a chip or a chip system used in the second radio access network device. The communication unit 122 is configured to support the communication apparatus in performing S901 and the like in the foregoing embodiments. The processing unit 121 is configured to support the communication apparatus in performing S903 and the like in the foregoing embodiments.

In still another example, the communication apparatus is a first network element or a chip or a chip system used in the first network element. The communication unit 122 is configured to support the communication apparatus in performing S1002 and the like in the foregoing embodiments. The processing unit 121 is configured to support the communication apparatus in performing S1005 and the like in the foregoing embodiments.

In a possible embodiment, the communication apparatus may further include a storage unit 123. The processing unit 121, the communication unit 122, and the storage unit 123 are connected through a communication bus.

The storage unit 123 may include one or more memories. The memory may be a component, in one or more devices or circuits, configured to store a program or data.

The storage unit 123 may exist independently, and is connected to the processing unit 121 of the communication apparatus through the communication bus. Alternatively, the storage unit 123 may be integrated with the processing unit.

The communication apparatus may be used in a communication device, a circuit, a hardware component, or a chip.

For example, the communication apparatus may be the chip or the chip system used in the user plane network element, the control plane network element, the second radio access network device, or the first network element in embodiments of this application. In this case, the communication unit 122 may be an input or output interface, a pin, a circuit, or the like. For example, the storage unit 123 may store computer-executable instructions of a method on the user plane network element, the control plane network element, the second radio access network device, or the first network element side, so that the processing unit 121 performs the method on the user plane network element, the control plane network element, the second radio access network device, or the first network element side in the foregoing embodiments. The storage unit 123 may be a register, a cache, a RAM, or the like. The storage unit 123 may be integrated with the processing unit 121. The storage unit 123 may be a ROM or another type of static storage device that can store static information and instructions, and the storage unit 123 may be independent of the processing unit 121.

An embodiment of this application provides a communication apparatus. The communication apparatus includes one or more modules, configured to implement the methods in the steps included in FIG. 8 to FIG. 12. The one or more modules may correspond to the steps in the methods in the steps included in FIG. 8 to FIG. 12. Specifically, for each step in a method performed by the user plane network element in embodiments of this application, the user plane network element includes a unit or module for performing each step in the method. For each step in a method performed by the control plane network element, the control plane network element includes a unit or module for performing each step in the method. For each step in a method performed by the second radio access network device, the second radio access network device includes a unit or module for performing each step in the method. For each step in a method performed by the first network element, the first network element includes a unit or module for performing each step in the method. For example, a module that controls or processes an action of the communication apparatus may be referred to as a processing module. A module that performs a step of processing a message or data on the communication apparatus side may be referred to as a communication module.

Figure 14:
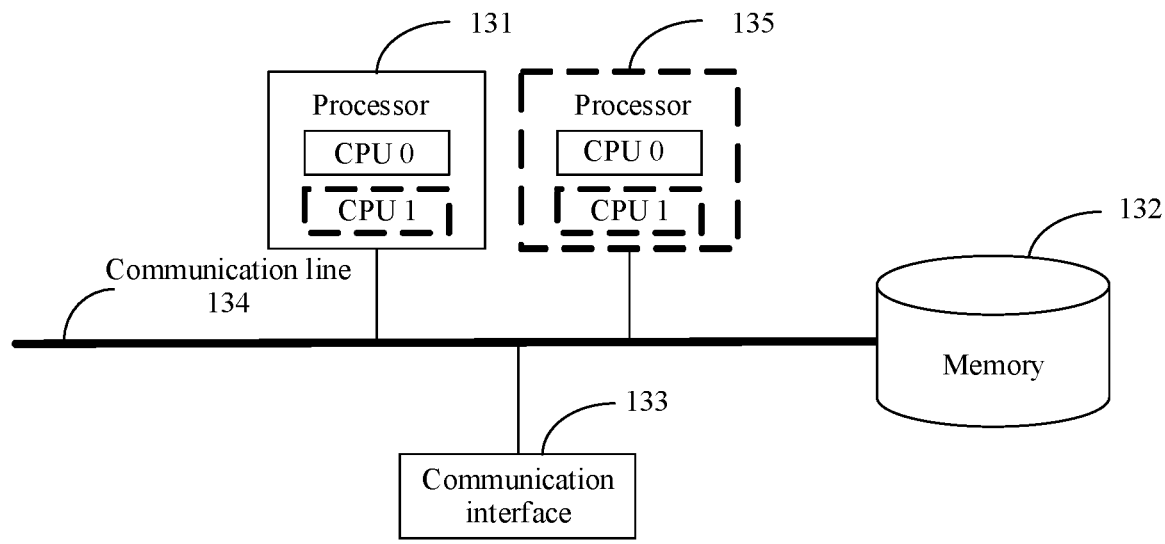
FIG. 14 is a schematic diagram of a structure of a communication device according to an embodiment of this application.

FIG. 14 is a schematic diagram of a hardware structure of a communication device according to an embodiment of this application. For hardware structures of the user plane network element, the control plane network element, the second radio access network device, or the first network element in embodiments of this application, refer to the schematic diagram of the hardware structure of the communication device shown in FIG. 14. The communication device includes a processor 131, a communication line 134, and at least one communication interface (a communication interface 133 is used as an example in FIG. 14 for description).

The processor 131 may be a general-purpose central processing unit (CPU), a microprocessor, an application-specific integrated circuit (ASIC), or one or more integrated circuits configured to control program execution of solutions of this application.

The communication line 134 may include a path for transmitting information between the foregoing components.

The communication interface 133 uses any apparatus such as a transceiver, and is configured to communicate with another device or a communication network such as the Ethernet, a radio access network (RAN), or a wireless local area network (WLAN).

Possibly, the communication device may further include a memory 132.

The memory 132 may be a read-only memory (ROM) or another type of static storage device that can store static information and instructions, a random access memory (RAM) or another type of dynamic storage device that can store information and instructions, an electrically erasable programmable read-only memory (EEPROM), a compact disc read-only memory (CD-ROM) or another compact disc storage, an optical disc storage (including a compact optical disc, a laser disc, an optical disc, a digital versatile disc, a Blu-ray disc, or the like), a magnetic disk storage medium or another magnetic storage device, or any other medium that can be used to carry or store expected program code in a form of instructions or a data structure and that is accessible by a computer, but is not limited thereto. The memory may exist independently, and is connected to the processor through the communication line 134. The memory may alternatively be integrated with the processor.

The memory 132 is configured to store computer-executable instructions for performing the solutions in this application, and the processor 131 controls execution. The processor 131 is configured to execute the computer-executable instructions stored in the memory 132, to implement a policy control method provided in the following embodiments of this application.

Possibly, the computer-executable instructions in this embodiment of this application may also be referred to as application program code. This is not specifically limited in this embodiment of this application.

In specific implementation, in an embodiment, the processor 131 may include one or more CPUs, for example, a CPU 0 and a CPU 1 in FIG. 14.

In specific implementation, in an embodiment, the communication device may include a plurality of processors, for example, the processor 131 and a processor 135 in FIG. 14. Each of the processors may be a single-core (single-CPU) processor, or may be a multi-core (multi-CPU) processor. The processor herein may be one or more devices, circuits, and/or processing cores configured to process data (for example, computer program instructions).

Figure 15:
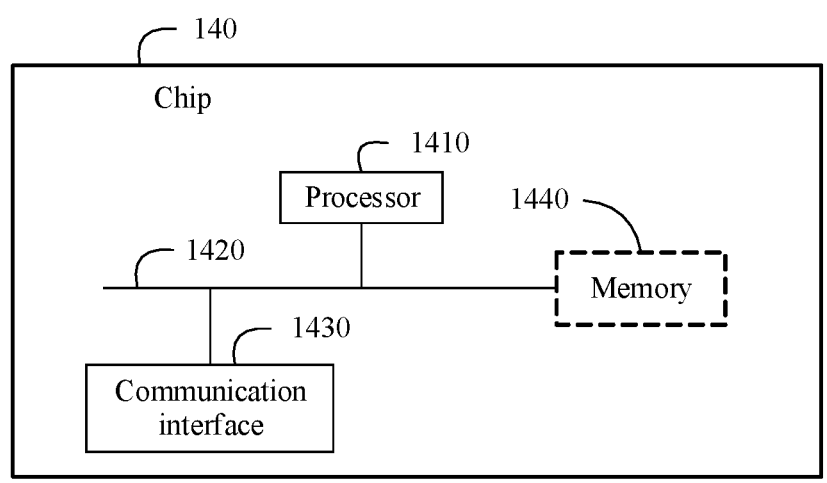
FIG. 15 is a schematic diagram of a structure of a chip according to an embodiment of this application.

FIG. 15 is a schematic diagram of a structure of a chip 140 according to an embodiment. The chip 140 includes one or more (including two) processors 1410 and a communication interface 1430.

In a possible embodiment, the chip 140 shown in FIG. 15 further includes a memory 1440. The memory 1440 may include a read-only memory and a random access memory, and provide operation instructions and data for the processor 1410. A part of the memory 1440 may further include a non-volatile random access memory (NVRAM).

In some implementations, the memory 1440 stores the following elements: an executable module or a data structure, a subset thereof, or an extended set thereof.

In this embodiment, a corresponding operation is performed by invoking the operation instructions stored in the memory 1440 (where the operation instructions may be stored in an operating system).

In a possible implementation, a structure of a chip used in a user plane network element, a structure of a chip used in a control plane network element, a structure of a chip used in a second radio access network device, and a structure of a chip used in a first network element are similar, and different apparatuses may use different chips to implement respective functions.

The processor 1410 controls an operation of a terminal device, a radio access network apparatus, or a session management network element, and the processor 1410 may also be referred to as a central processing unit (CPU). The memory 1440 may include a read-only memory and a random access memory, and provide instructions and data for the processor 1410. A part of the memory 1440 may further include a non-volatile random access memory (NVRAM). For example, in an application, the memory 1440, the communication interface 1430, and the memory 1440 are coupled together via a bus system 1420. The bus system 1420 may further include a power bus, a control bus, a status signal bus, and the like in addition to a data bus. However, for clear description, various types of buses in FIG. 15 are marked as the bus system 1420.

The foregoing communication unit may be an interface circuit or a communication interface of the apparatus, and is configured to receive a signal from another apparatus. For example, when the apparatus is implemented as a chip, the communication unit is an interface circuit or a communication interface that is of the chip and that is configured to receive a signal from or send a signal to another chip or apparatus.

The foregoing methods may be applied to the processor 1410 or implemented by the processor 1410. The processor 1410 may be an integrated circuit chip and has a signal processing capability. In an implementation process, the steps of the foregoing methods may be implemented using a hardware integrated logical circuit in the processor 1410, or using instructions in a form of software. The processor 1410 may be a general-purpose processor, a digital signal processor (DSP), an application-specific integrated circuit (ASIC), a field-programmable gate array (FPGA) or another programmable logic device, a discrete gate or transistor logic device, or a discrete hardware component. The processor may implement or perform the methods, steps, and logical block diagrams that are disclosed in embodiments described herein. The general-purpose processor may be a microprocessor, or the processor may be any conventional processor or the like. The steps in the methods disclosed with reference to embodiments may be directly performed by a hardware decoding processor, or may be performed using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 1440, and the processor 1410 reads information in the memory 1440 and completes the steps in the foregoing methods in combination with hardware of the processor.

In a possible implementation, the communication interface 1430 is configured to perform receiving and sending steps of the user plane network element, the control plane network element, the second radio access network device, or the first network element in embodiments shown in FIG. 8 to FIG. 12. The processor 1410 is configured to perform processing steps of the user plane network element, the control plane network element, the second radio access network device, or the first network element in embodiments shown in FIG. 8 to FIG. 12.

In embodiments, the instructions that are stored in the memory and that are to be executed by the processor may be implemented in a form of a computer program product. The computer program product may be written into the memory in advance, or may be downloaded and installed in the memory in a form of software.

The computer program product includes one or more computer instructions. When the computer program instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (SSD)), or the like.

An embodiment of this application further provides a computer-readable storage medium. All or some of the methods described in the foregoing embodiments may be implemented using software, hardware, firmware, or any combination thereof. If the methods are implemented in the software, functions may be used as one or more instructions or code and stored in the computer-readable medium or transmitted on the computer-readable medium.

The computer-readable medium may include a computer storage medium and a communication medium, and may further include any medium that can transfer a computer program from one place to another. The storage medium may be any target medium that can be accessed by a computer.

In a possible design, the computer-readable medium may include a RAM, a ROM, an EEPROM, a CD-ROM, or another optical disc storage, a magnetic disk storage or another magnetic storage device, or any other medium that is used to carry or store required program code in a form of instructions or a data structure and that may be accessed by the computer. In addition, any connection is appropriately referred to as a computer-readable medium. For example, if a coaxial cable, an optical fiber cable, a twisted pair, a digital subscriber line (DSL), or wireless technologies (such as infrared, radio, and microwave) are used to transmit software from a website, a server, or another remote source, the coaxial cable, the optical fiber cable, the twisted pair, the DSL, or the wireless technologies such as infrared, radio, and microwave are included in a definition of the medium. Magnetic disks and optical discs used in this specification include a compact disc (CD), a laser disc, an optical disc, a digital versatile disc (DVD), a floppy disk, and a Blu-ray disc. The magnetic disks usually magnetically reproduce data, and the optical discs optically reproduce data using lasers. The foregoing combinations should also be included within a scope of the computer-readable medium.

An embodiment of this application further provides a computer program product. All or some of the methods described in the foregoing embodiments may be implemented using software, hardware, firmware, or any combination thereof. If the methods are implemented in the software, all or some of the methods may be implemented in a form of a computer program product. The computer program product includes one or more computer instructions. When the foregoing computer program instructions are loaded and executed on a computer, all or some of the procedures or functions described in the foregoing method embodiments are generated. The computer may be a general-purpose computer, a dedicated computer, a computer network, a base station, a terminal, or another programmable apparatus.

The objectives, technical solutions, and benefits of the present disclosure are further described in detail in the foregoing specific embodiments. It should be understood that the foregoing descriptions are merely specific embodiments, but are not intended to limit the scope of the present invention. Any modification, equivalent replacement, or improvement made on the basis of the technical solutions of the present disclosure may fall within the scope of the present invention.

It should be noted that the network elements in embodiments of this application may alternatively use other definitions or names in specific application. For example, the SMF network element may be referred to as a control plane network element, and the UPF network element may be referred to as a user plane network element. Alternatively, the foregoing network elements may also be collectively referred to as core network elements. Alternatively, other names may be defined for the foregoing network elements based on actual functions. This is not specifically limited in embodiments of this application.

What is claimed is:

1. A communication method, comprising:
receiving, by a user plane network element from a control plane network element, information indicating a first policy for maintaining, when communication between the user plane and the control plane is abnormal, continuity of a service of the user plane; and
running, by the user plane network element, the service of the user plane according to the first policy
wherein the maintaining, when the communication between the user plane and the control plane is abnormal, continuity of the service of the user plane comprises:
establishing, by the user plane network element, a data channel connection relationship with a radio access network device according to an indication of a first network element,
wherein the first network element is deployed in a physical location area to which the user plane network element belongs, and
wherein the first network element is configured not to register with a network repository function network element in a core network.

2. The method according to claim 1, wherein the first policy further comprises one or more of the following:
a policy for continuing to run, when the communication between the user plane and the control plane is abnormal, the service of the user plane;
a policy for continuing to run, when the communication between the user plane and the control plane is abnormal, the service of the user plane until the service of the user plane ends;
a policy for continuing to run, when the communication between the user plane and the control plane is abnormal, the service of the user plane until a connection between the control plane and the user plane is recovered;
a policy for configuring, when the communication between the user plane and the control plane is abnormal and a traffic quota of the user plane in a current period is used up, at least one of a first duration or a first threshold of traffic for the service of the user plane, so that the service of the user plane continues to be run based on at least one of the first duration or the first threshold of traffic; and/or a policy for continuing to run, when the communication between the user plane and the control plane is abnormal and a use time of a traffic quota of the user plane in a current period is expired, the service of the user plane until the traffic quota of the user plane in the current period is used up.

3. The method according to claim 2, wherein the information indicating the first policy is an enumerated value.

4. The method according to claim 2, wherein the first policy is determined by the control plane network element based on traffic quota information of the service and policy control information of the service.

5. The method according to claim 1, wherein the running, by the user plane network element, the service of the user plane according to the first policy comprises:
maintaining, by the user plane network element, a data channel connection relationship with a first radio access network device when the communication between the user plane and the control plane is abnormal, wherein the first radio access network device is a radio access network device connected to the user plane network element when the communication between the user plane and the control plane is abnormal.

6. The method according to claim 1, wherein the first policy comprises a policy for disabling, when communication between the user plane and the control plane is abnormal, a session control timer mechanism.

7. The method according to claim 1, wherein the receiving, by the user plane network element from a control plane network element, information indicating a first policy comprises receiving, by the user plane network element, a message from the control plane network element, and wherein the message does not carry a header field related to a session control timer mechanism, the method further comprising:
sending, by the user plane network element, the message to a terminal device.

8. The method according to claim 1, further comprising:
determining, by the user plane network element, traffic usage of the service run during disconnection between the user plane and the control plane; and
sending, by the user plane network element, the traffic usage to the control plane network element when the connection between the control plane and the user plane is recovered.

9. The method according to claim 1, further comprising:
triggering, when the service of the user plane network element is not run for more than a second duration, checking of resource usage of the user plane network element;
triggering, when a resource usage rate of the user plane network element exceeds a threshold, checking of resource usage of the user plane network element; or
triggering, when the connection between the control plane and the user plane is recovered, checking of resource usage of the user plane network element.

10. A communication method, comprising:
determining, by a radio access network device, that communication between a user plane and a control plane is abnormal by:
receiving, by the radio access network device, first indication information from a first network element deployed in a physical location area to which a user plane network element belongs, the first indication information indicating that communication between the user plane and the control plane is abnormal, the first network element being configured not to register with a network repository function network element in a core network; and
maintaining, by the radio access network device, continuity of a service of the user plane when the communication between the user plane and the control plane is abnormal.

11. The method according to claim 10, wherein the maintaining, by the radio access network device, the continuity of service of the user plane when communication between the user plane and the control plane is abnormal comprises:
obtaining, by the radio access network device, context data of a terminal device from a further radio access network device that communicates with the terminal device when communication between the user plane and the control plane is abnormal, wherein the context data of the terminal device is used to recover a connection between the terminal device and the radio access network device;
notifying, by the radio access network device, the further radio access network device to maintain a connection to the user plane network element; and
forwarding, by the radio access network device, data of the terminal device to the user plane network element via the further radio access network device.

12. The method according to claim 10, wherein the first indication information is a cause value.

13. A communication method, comprising:
establishing, by a first network element, a communication connection to a radio access network device when communication between a user plane and a control plane is abnormal, wherein the first network element is deployed in a physical location area to which a user plane network element belongs; and
maintaining, by the first network element, continuity of a service of the user plane based on the communication connection to the radio access network device, wherein the first network element is configured not to register with a network repository function network element in a core network.

14. The method according to claim 13, wherein the maintaining, by the first network element, the continuity of the service of the user plane based on the communication connection to the radio access network device comprises:
sending, by the first network element, first indication information to the radio access network device, wherein the first indication information indicates that communication between the user plane and the control plane is abnormal.

15. The method according to claim 13, further comprising:
instructing, by the first network element via a second network element, the user plane network element to establish a data channel connection relationship with the radio access network device,
wherein the second network element is deployed in the physical location area to which the user plane network element belongs, and
wherein a communication interface exists between the second network element and each of the first network element and the user plane network element.

16. The method according to claim 13, wherein:
the first network element and a network element of a same type in the core network belong to a same set,
a physical location area to which the user plane network element belongs is a first campus, and
a network element of a second campus with the same type of the first network element shares the same identifier with the first network element.

17. The method according to claim 16, wherein:
the first network element is an access management function network element, and
the identifier is a globally unique access management function identifier.

18. The method according to claim 17, further comprising:
Allocating different temporary international mobile subscriber identities of globally unique temporary identity are allocated to the network element of the first campus and the network element of the second campus.

* * * * *